United States Patent
Michels et al.

(10) Patent No.: US 9,733,492 B2
(45) Date of Patent: Aug. 15, 2017

(54) SET OF SPECTACLE LENS SEMIFINISHED PRODUCTS, APPARATUS FOR MAKING SPECTACLE LENSES AND METHOD THEREFOR

(71) Applicant: Carl Zeiss Vision International GmbH, Aalen (DE)

(72) Inventors: Georg Michels, Aalen (DE); Timo Kratzer, Aalen (DE); Gerd Nowak, Neresheim (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/339,755

(22) Filed: Oct. 31, 2016

(65) Prior Publication Data

US 2017/0102555 A1    Apr. 13, 2017

Related U.S. Application Data

(63) Continuation of application No. PCT/EP2015/065674, filed on Jul. 9, 2015.

(30) Foreign Application Priority Data

Jul. 10, 2014   (DE) .................. 10 2014 213 393

(51) Int. Cl.
    *G02C 7/00*   (2006.01)
    *G02C 7/02*   (2006.01)

(52) U.S. Cl.
    CPC ............ *G02C 7/028* (2013.01); *G02C 7/022* (2013.01); *G02C 2202/08* (2013.01)

(58) Field of Classification Search
    CPC .......... G02C 7/022; G02C 7/02; G02C 7/021; G02C 7/024; G02C 7/028; G02C 2202/08
    (Continued)

(56) References Cited

U.S. PATENT DOCUMENTS 3,134,208 A   5/1964  Richmond
4,089,102 A   5/1978  Soper et al.
(Continued)

FOREIGN PATENT DOCUMENTS

DE    25 31 134 A1    1/1976
DE    39 24 078 A1    1/1991
(Continued)

OTHER PUBLICATIONS

DIN ISO 10110-12 Optik und Photonik—Erstellung von Zeichnungen fuer optische Elemente und Systeme—Teil 12: Asphaerische Oberflaechen (ISO 10110-12:2007 + Amd 1:2013), DIN Deutsches Institut fuer Normung, e. V. , 23 pages, Apr. 2016.
(Continued)

*Primary Examiner* — James Greece
*Assistant Examiner* — Travis Fissel
(74) *Attorney, Agent, or Firm* — Walter Ottesen, P.A.

(57) ABSTRACT

A set of eyeglass lens semifinished products is provided and is composed of at least three series of eyeglass lens semifinished products having spherical or rotationally symmetric aspherical front surfaces. The series of eyeglass lens semifinished products differ in pairs in the base material of the series. Each of the series includes at least three types of eyeglass lens semifinished products which differ in pairs and the front surface shapes. The front surface shapes of the at least three types are identical on a central partial surface within the actual surface refractive power range of the front surface of the series in relation to a standard index of refraction of 1.53 between 3.2 D and 6.7 D.

16 Claims, 10 Drawing Sheets

(58) Field of Classification Search
USPC ............ 351/159.73, 159.74, 159.41–159.49,
351/159.53–159.55, 159.63, 159.64,
351/159.65, 159.69, 159.71, 159.72,
351/159.76, 159.77, 159
See application file for complete search history.

(56) References Cited

U.S. PATENT DOCUMENTS

| | | | |
|---|---|---|---|
| 4,300,821 | A | 11/1981 | Mignen |
| 6,089,713 | A | 7/2000 | Hof et al. |
| 6,103,148 | A | 8/2000 | Su et al. |
| 6,523,443 | B1 | 2/2003 | Hof et al. |
| 6,857,742 | B2 | 2/2005 | Shirayanagi et al. |
| 6,948,816 | B2 | 9/2005 | Yamamoto et al. |
| 7,083,279 | B2 | 8/2006 | Haidl et al. |
| 7,500,908 | B2 | 3/2009 | Achy et al. |
| 8,313,194 | B2 | 11/2012 | Colas et al. |
| 9,146,405 | B2 | 9/2015 | Watanabe |
| 2010/0283966 | A1* | 11/2010 | Colas ............... G02C 7/02 351/159.81 |

FOREIGN PATENT DOCUMENTS

| | | |
|---|---|---|
| DE | 197 01 312 A1 | 7/1998 |
| EP | 0 955 147 A1 | 11/1999 |
| EP | 2 028 527 A1 | 2/2009 |
| EP | 2 692 941 A1 | 2/2014 |
| JP | 3121763 A | 11/1997 |
| JP | 2008-191186 A | 8/2008 |
| JP | 2013217948 A | 10/2013 |
| WO | 2004/019243 A1 | 3/2004 |

OTHER PUBLICATIONS

Office action and English translation of the Office action of the German Patent Office dated Jun. 26, 2015 in German patent application 10 2014 213 393.9 on which the claim of priority is based.

Diepes, H. et al, "Optik und Technik der Brille", Optische Fachveroefftlichung GmbH, Heidelberg, Germany, 2002, p. 560 and English translation thereof.

Translation and International Preliminary Report on Patentability and Written Opinion dated Aug. 17, 2016 of international application PCT/EP2015/065674 on which this application is based.

Office action of the Canadian Intellectual Property Office dated Dec. 7, 2016 in corresponding Canadian patent application 2,946,957.

Office action of the Australian Intellectual Property Office dated Dec. 19, 2016 in corresponding Australian patent application 2015286727.

Office action of the Vietnamese Intellectual Property Office dated Feb. 21, 2017 in corresponding Vietnamese patent application 1-2016-04117.

Diepes, H. et al, "Optik and Technik der Brille", Optische Fachveroefftlichung GmbH, Heidelberg, Germany, 2002, p. 560.

Shamir, "Shamir Quick Reference Guide", Dec. 6, 2013, pp. 1 to 5, retrieved on Sep. 16, 2015. http://www.shamiroptic.de/images/shamir.pdf.

DIN EN ISA 13666, "Opthalmic optics—Spectacle lenses—Vocabulary (ISO 13666:2012)", DIN Deutsches Institut fuer Normung, e.V., 114 pages, Oct. 2013.

International Search Report dated Sep. 28, 2015 of international application PCT/EP2015/065674 on which this application is based.

Translation of Office action of the Japanese Intellectual Property Office dated Mar. 15, 2017 in corresponding Japanese patent application 2016-565297.

Translation of Office action of the Korean Intellectual Property Office dated Mar. 15, 2017 in corresponding Korean patent application 10-2016-7030097.

* cited by examiner

SET OF SPECTACLE LENS SEMIFINISHED PRODUCTS, APPARATUS FOR MAKING SPECTACLE LENSES AND METHOD THEREFOR

CROSS REFERENCE TO RELATED APPLICATIONS

This application is a continuation application of international patent application PCT/EP2015/065674, filed Jul. 9, 2015, designating the United States and claiming priority from German application 10 2014 213 393.9, filed Jul. 10, 2014, and the entire content of both applications is incorporated herein by reference.

FIELD OF THE INVENTION

The present invention relates to a set of semifinished products for producing spectacle lenses and a method for making spectacle lenses. The invention furthermore relates to the use of a set of semifinished products in a method for producing spectacle lenses. The invention furthermore relates to an apparatus for producing spectacle lenses. Furthermore, the invention relates to a method for configuring a set of semifinished products for producing spectacle lenses. Finally, the invention relates to a computer program with program code for carrying out all of the method steps of the method for configuring a set of semifinished products for producing spectacle lenses of the generic type, and a computer-readable storage medium comprising a computer program with program code for carrying out all of the method steps of the method for configuring a set of semifinished products for producing spectacle lenses of the generic type.

BACKGROUND OF THE INVENTION

Spectacles are a structure usually worn in front of the eyes, comprising at least one spectacle lens serving to protect the eye or to correct defective vision and positional errors of the eyes. Spectacle lenses for correcting defective vision are therefore also referred to as corrective lenses or optically effective spectacle lenses. By way of example, such spectacle lenses could be single vision lenses on multi-focal lenses, in particular bifocal lenses, trifocal lenses or else varifocal lenses. By way of example, defective vision could include shortsightedness (myopia), farsightedness (hyperopia), astigmatism and further states of vision which deviate from the norm and/or are suboptimal. The defective vision also includes age-related farsightedness (presbyopia).

Corrective lenses are distinguished as positive lenses and negative lenses. A positive lens has a converging optical effect that magnifies the observed object. A negative lens has a diverging optical effect that reduces the observed object.

Spectacle lenses are usually produced specifically to order according to the specific demands adapted to the individual spectacle wearer. In general, the spectacle lenses are manufactured by using a restricted number of different types of semifinished spectacle lens blanks, the so-called semifinished products, which are stored by the spectacle lens manufacturer. Spectacle lens semifinished products, just like spectacle lens finished products, each have an optical surface destined for the object side and an optical surface destined for the opposite eye side arrangement for the spectacle wearer; and a surface spacing these apart. The optical surface destined for arrangement on the object side is referred to as front surface; the optical surface destined for arrangement on the eye side is referred to as back surface. The surface lying therebetween, which either directly forms an edge or indirectly adjoins the front surface at one end and the back surface at the other end by way of an edge surface, is referred to as cylinder edge surface. In general, the front surface has a convex curvature; the rear surface is concave.

What form must be obtained by the spectacle lens in order to obtain the desired optical correction is decisively determined by the material thereof. Here, the most important parameter is the refractive index of the material. While spectacle lenses were predominantly produced from mineral glasses in the past, in particular crown glasses (Abbe number>55) and flint glasses (Abbe number<50), spectacle lenses from a multiplicity of organic materials have become available in the meantime. Such base materials for organic spectacle lenses are offered under the trade names CR 39, MR 8, MR 7, CR 330 and MR 174. A selection of such base materials is also found in the published specification EP2692941 A1. Other materials are continuously being tested and developed in respect of the suitability thereof for organic spectacle lenses. Table 1, below, elucidates characteristic variables and reference variables of a selection of known base materials:

| Trade name | Base material | Average refractive index $n_e$ | Abbe number $v_e$ |
|---|---|---|---|
| CR 39 | Poly allyl diglycol | 1.500 | 56 |
| CR607 | carbonate | | |
| CR630 | | | |
| Trivex | Polyurea/Polyurethane | 1.530 | 45 |
| PC | Polycarbonate | 1.590 | 29 |
| MR 8 | Polythiourethane | 1.598 | 41 |
| MR 7 | Polythiourethane | 1.664 | 32 |
| MR 10 | Polythiourethane | 1.666 | 32 |
| MR 174 | Poly(episulfide) | 1.738 | 32 |
| | Mineral 1.5 | 1.525 | 58 |
| | Mineral 1.6 | 1.604 | 44 |

Currently, a large number of organic spectacle lens semifinished products or finished products with spherical, rotationally symmetric aspherical or progressive front surfaces are cast in mass production in prototypes with front and back surface form shells, which are spaced apart from one another by means of a sealing ring, forming a cavity in the process, as described in, for example, the documents U.S. Pat. Nos. 4,300,821, 6,103,148A or JP2008191186 A. This applies to base materials with the trade names MR 7, MR 8, MR 10 and CR 39, CR 607, CR 630, et al. The base materials with the trade names MR 7, MR 8, and MR 10 are polythiourethanes marketed by Mitsui Chemicals. Here, the abbreviation "MR" stands for Mitsui Resin. CR 39 or Columbia Resin 39 is the brand name selected by Pittsburgh Plate Glass Industries (PPG Industries) under which the material poly diethylene glycol bis allyl carbonate or poly allyl diglycol carbonate (abbreviation: PADC) is marketed. This is a highly-refractive duroplastic polymer material. CR 607 and CR 630 are also produced by PPG. The materials CR 607 and CR 630 are used for example for photochromic applications.

Semifinished products of finished products for spectacle lenses made out of polycarbonate are generally produced in metal forms by means of an injection molding technique. This production method is described in, for example, EP 0955147 A1.

Mineral spectacle lenses are generally produced by machine-based mechanically abrasive machining of a blank.

The semifinished products or finished products described above are often subjected to one or more finishing processes.

In particular, functional layers are applied to one or both sides. Such functional layers are layers which equip the spectacle lenses with predetermined properties, which are advantageous to the spectacle wearer and which the spectacle lenses would not have purely on the basis of the property of the basic or carrier material, onto which the functional layers are applied where necessary, and the forming. In addition to optical properties, such as an antireflection coating, silvering, light polarization, coloring, self-tinting et cetera, such advantageous properties also include mechanical properties, such as hardening, reduction of the adherence of dirt or reduction in steaming up, et cetera, and/or electrical properties such as shielding from electromagnetic radiation, conductance of electrical current, et cetera, and/or other physical or chemical properties.

Order-specific prescription spectacle lenses, that is, in particular, individualized single vision and multi-focal lenses, the optical properties of which are not standardized in a preselectable manner, at least in part, but which are individually calculated and manufactured in a manner adapted to the user in relation to the dimensions and/or the arrangement thereof on the spectacle lens, and, in particular, varifocal or progressive lenses are brought into their final form by mechanical, in particular deforming and/or abrasive, methods. Here, the outer forms may have a round, oval or arbitrary embodiment, describing a so-called free form in the latter case.

One surface of the semifinished spectacle lens blank forms the final surface of the finished spectacle lens. The other surface is machined in such a way that the optical system of the finished spectacle lens corresponds to the ophthalmic prescription of the spectacle wearer. In general, provision is made for the front surface to form the final front surface of the finished spectacle lens. Relatively small machining of the final front surface may be undertaken, but always without the curvature thereof being modified. In particular, it is possible for one or more functional layers of the type described above to be applied. Accordingly, spectacle lens semifinished products are lens blanks with only one surface where machining in optical terms has been completed (cf. Heinz Diepes, Rolf Blendowske "Optik and Technik der Brille", Optische Fachveröffentlichung GmbH, Heidelberg, 2002, page 560). As will be once again clarified below, the present invention only relates to the spectacle lens semifinished products with a spherical or rotationally symmetric aspherical front surface and a back surface to be machined in accordance with the ophthalmic prescription of the spectacle wearer.

Within the scope of the present invention, and pursuant to section 11.3 of the DIN standard EN ISO 13666:2012 (ophthalmic optics—spectacle lenses vocabulary) incorporated herein by reference, the nominal surface power value or the nominal curvature of the front surface of a spectacle lens is referred to as base curve. Alternatively, the term basic curve is also used instead of a term base curve. The refractive index assumed during the measurement should be specified if the nominal surface power value is specified. If flagged appropriately, it would also be possible to specify the nominal curvature or the nominal radius of curvature instead of the surface power value. Even though DIN EN ISO 13666:2012 only refers to the front surface of a single vision lens in view of the designation as base curve, below a base curve refers, in general, to the nominal surface power value at the center of a rotationally symmetric front surface of a spectacle lens semifinished product which is suitable not only for the production of single vision lenses but also for the production of multi-focus lenses. In the case of the rotationally symmetric aspherical surfaces, the nominal curvature corresponds to the vertex curvature. In the case of the rotationally symmetric aspherical surfaces, the nominal radius of curvature corresponds to the vertex radius.

In general, the base curves are specified with reference to a standard refractive index of 1.53. However, other refractive indices may also be used in order to specify base curves.

Typically, the spectacle lens manufacturers produce a series of semifinished spectacle lens blanks, which each have a dedicated base curve. This "base curve series" is a set of semifinished products, the nominal front face curvatures and power values increase in steps (for example, +0.50 D, +2.00 D, +4.00 D and so on), as described in, for example, Shamir: "Shamir Quick Reference Guide", Dec. 6, 2013, pages 1 to 5; retrieved on 9/16/2015 from the Internet; URL: http://www.shamiroptic.de/images/shamir.pdf.

The nominal surface power value or the nominal curvature is used for labeling purposes and also referred to as nominal basic curve. The actual surface power value or the actual curvature is used for the calculation. It is also referred to as actual basic curve. In the following explanations, reference is made to the actual values, that is, the actually present surface power value, the actually present curvature and the actually present radius of curvature of the surfaces—taking into account the usual manufacturing and measurement tolerances—unless reference is explicitly made to the nominal values.

The front face of a semifinished product of a base curve series serves as a starting point to calculate the optical surface of the back surface and according to which the final spectacle lens according to the prescription of a spectacle wearer is produced.

The front faces of the semifinished lens blanks of a base curve series may, in principle, be both rotationally symmetric surfaces, such as, for example, spheres or rotationally symmetric aspherical surfaces, and non-rotationally symmetric surfaces, such as, for example, toric surfaces or else varifocal surfaces. The latter may also be embodied without any symmetry property. In this case, they are referred to as free-form surfaces. Only spectacle lens semifinished products with rotationally symmetric, that is, spherical or rotationally symmetric aspherical, front surfaces are relevant within the scope of the present invention.

By way of example, after selecting a semifinished lens blank from a set of semifinished products with different spherical or rotationally symmetric aspherical front faces, progressive addition lenses (PALs) may be produced by pure machine-based machining of the back surface taking into account the individually required addition, the prescription values and, optionally, further individual requirements of the spectacle wearer, as is described in, for example, U.S. Pat. No. 6,089,713, WO2004/019243 A1 or U.S. Pat. No. 8,313, 194. The back surface does not have point symmetry and/or axial symmetry, but has multifocal properties.

Each base curve in a series is usually used for the production of a plurality of prescriptions, which are recommended by the manufacturer of the semifinished product set. The manufacturers provide so-called base-curve selection charts, from which the different prescriptions, for which the use of the respective base curve in the series is recommended, can be gathered.

An example of a typical base-curve selection chart can be gathered from the patent document U.S. Pat. No. 6,948,816. The base curve series shown in FIGS. 23A to C of this patent document consists of five base curves. The selection chart shows the base curve recommended by the manufacturer in accordance with a given prescription as a function of the spherical effect and the cylindrical effect for correcting an astigmatic aberration. The shown selection chart relates to progressive lenses (PALs), in which the optical effect changes between distance part and near part. In general, the same type of selection chart is used for every type of spectacle lens, such as, for example, (spherical and/or toric) single vision lenses, bifocal lenses, aspherical lenses and PALs.

Two further examples of base-curve selection charts are gathered from FIGS. 2 and 3 in EP2028527 B1. The base curve series according to FIG. 2 consists of eight base curves, which are labeled by the numbers "1" to "8" and the base curve series according to FIG. 3 comprises fourteen base curves, which are labeled by the numbers "1" to "14". The nominal refractive power of the fourteen spherical base curves of the base curve series according to FIG. 3 increases in the following steps: 0.75; 1.00; 1.50; 2.00; 2.75; 3.25; 3.75; 4.25; 5.25; 5.75; 6.25; 6.50; 7.50; 8.50 from 0.75 D to 8.50 D.

From U.S. Pat. No. 8,313,194, it is possible to gather that the general trend consists of restricting the number of different base curves of a base curve series in order to minimize the number of molds, the costs for storage and the requirements placed on storage. Therefore, a standard base curve series comprises at most twenty base curves (cf. EP2028527 B1: paragraph [0013]), such as, for example, ten (cf. EP0857993 A2: page 5, lines 38-51) or five base curves (U.S. Pat. No. 6,948,816: FIGS. 23A to C).

The documents specified in the two paragraphs above all consider the subject of optimizing the base curves of a base curve series for spectacle lenses made of a predetermined base material. Presumably, the authors of these documents assume manufacturing at the large spectacle lens manufacturers.

From WO2004/019243 A1 set forth at the outset, it is possible to gather that it is desirable for, in particular, the individual varifocal spectacle lenses described above to be able to be produced not only by a few spectacle lens manufacturers, but also locally in wholesale businesses, large laboratories and the like, as are currently active in many markets.

SUMMARY OF THE INVENTION

An object of the invention therefore is to provide a set of spectacle lens semifinished products, a method for producing spectacle lenses, the use of a set of semifinished products in a method for producing spectacle lenses, an apparatus for producing spectacle lenses and a method for configuring a set of semifinished products for producing spectacle lenses with a corresponding computer program with program code for carrying out all of the method steps of this method and with a corresponding computer-readable storage medium with a computer program with program code for carrying out all of the method steps of this method for configuring a set of semifinished products which, in particular, are tailored to the requirements of local manufacturing of the spectacle lenses.

This object is achieved by a set of semifinished products for producing spectacle lenses, a method for producing spectacle lenses, the use of a set of semifinished products in a method for producing spectacle lenses, an apparatus for producing spectacle lenses and a method for configuring a set of semifinished products for producing spectacle lenses.

The invention is based on the assumption that there will be a multiplicity of manufacturing sites for spectacle lenses in the near future which, in accordance with the combination of the teaching from U.S. Pat. No. 6,089,713 and WO2004/019243 A1, obtain spectacle lens semifinished products with, in each case, a pre-manufactured spherical or rotationally symmetric aspherical front surface, possibly from different manufacturers, calculate the configuration of the back surface in a manner adapted to the respective user, or let this be calculated, and manufacture the back surface in accordance with the calculation by way of machines of the type described in DE 195 38 274 A1.

The manufacturing machines at these manufacturing sites require a certain amount of standardization for the economic production of the spectacle lenses. The invention is based on the idea of reducing, overall, the number of spectacle lens semifinished product types to be machined. The basic concept of the invention consists of only providing semifinished products with a restricted number of front face (partial) geometries, to be precise independently of the refractive index of the machined spectacle lens base material. Using this, it is possible to reduce the number of receiving tools, which hold the respective semifinished product while the back side machining is carried out since semifinished products with a similar form can be received by the same tool. Restricting the number of receiving tools offers the possibility of standardization to a corresponding extent.

Proceeding from a set of spectacle lens semifinished products, which each have a front surface with a spherical or rotationally symmetric aspherical, convex form, which has at least one physical form feature with an associated form dimension, comprising a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value of the front surface thereof of between 3.2 D and 6.7 D in relation to a standard refractive index of 1.53 and determined, in the case of a rotationally symmetric aspherical form of the front surface, at the center of symmetry thereof, a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof, a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof, the invention provides for at least three different types of the pairwise different types of the second series to have an actual surface power value of the front surface thereof of between 3.2 D and 6.7 D in relation to a standard refractive index of 1.53, at least three different types of the pairwise different types of the third series to have an actual surface power value of the front surface thereof of between 3.2 D and 6.7 D in relation to a standard refractive index of 1.53, and the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series to be identical.

Expressed differently, the set of spectacle lens semifinished products according to the invention consists of at least three series of spectacle lens semifinished products with spherical or rotationally symmetric aspherical front surfaces. The series of spectacle lens semifinished products differ pairwise in respect of the respective base material thereof. The base materials have different average refractive indices. Within an actual surface power value range of the front surface thereof of between 3.2 D and 6.7 D in relation to a standard refractive index of 1.53, each one of the series comprises pairwise different types of spectacle lens semifinished products, the front surface forms of which having embodiments which are somehow different. Within this actual surface power value range of the front surface thereof of between 3.2 D and 6.7 D in relation to the standard refractive index of 1.53, the front surface forms of at least three of these types are identical on a subarea (preferably comprising the center of symmetry of the front surface) (which subarea preferably comprises more than 40%, more preferably more than 50%, of the entire front surface) or on the entire front surface thereof for all of the at least three series.

According to the invention, the at least one form feature (R, R1, R2, . . . R20, $D_n$) is/are:
a) the actual curvature and/or
b) the actual radius of curvature and/or
c) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and $A_4, A_6, \ldots$ are the coefficients of the correction polynomial. The standard DIN ISO 10110 referred to above is incorporated herein by reference.

Reference is made to the fact that, in principle, it is possible for the series to comprise both spectacle lens semifinished products with rotationally symmetric aspherical front surfaces and spectacle lens semifinished products with spherical front surfaces. However, in practice, it was found that, for manufacturing reasons, use is preferably made of series which only contain semifinished products with purely spherical front surfaces. Alternatively, it is likewise possible to use series which only contain semifinished products with purely rotationally symmetric aspherical front surfaces.

The problem posed at the outset is solved in its entirety by this set of spectacle lens semifinished products.

In one configuration of the invention, provision is made for the first average refractive index and the second average refractive index and the third average refractive index to differ pairwise by at least 0.04. This ensures that both spectacle lens semifinished product series made of low-refractive base materials and series of spectacle lens semifinished products made of high-refractive base materials are configured according to the invention, as a result of which the possible scope of delivery is determined and possibly extended.

Provision is made for the average refractive indices of the at least three base materials to differ by at least 0.05 or even by at least 0.06. The larger the difference in the average refractive indices of the at least three base materials, the greater the possibility of standardizing the receiving tools, required during the machining, for receiving the front surfaces of the spectacle lens semifinished products.

A particularly advantageous variant consists of the base material of the first series of spectacle lens semifinished products being CR 39, the base material of the second series of spectacle lens semifinished products being MR 8 and the base material of the third series of spectacle lens semifinished products being MR 7. An alternative variant consists of the base material of the first series of spectacle lens semifinished products being CR 39, the base material of the second series of spectacle lens semifinished products being MR 8 and the base material of the third series of spectacle lens semifinished products being MR 174. A further advantageous variant consists of base material of the first series of spectacle lens semifinished products being CR 39, the base material of the second series of spectacle lens semifinished products being polycarbonate and the base material of the third series of spectacle lens semifinished products being MR 8. Finally, in another preferred variant, the base material of the first series of spectacle lens semifinished products is CR 39, the base material of the second series of spectacle lens semifinished products is polycarbonate and the base material of the third series of spectacle lens semifinished products is MR 174.

From a manufacturing point of view, it is advantageous to keep the overall number of different front surface geometries over all series of spectacle lens semifinished products as small as possible. Approximately five different semifinished products types would be desirable over a base curve delivery range with an actual surface power value of the front surface thereof of, for example, between 0.5 D and 9.6 D in relation to a standard refractive index of 1.53 such that the above-specified minimum number of three types falls in the above-specified range of between 3.2 D and 6.7 D. From an optical point of view, it is expedient to have a large overall number of different front surface geometries. Approximately 20 different semifinished product types would be desirable over a base curve delivery range with an actual surface power value of the front surface thereof of, for example, between 0.5 D and 9.6 D in relation to a standard refractive index of 1.53 such that approximately ten to thirteen types fall in the above-specified range of between 3.2 D and 6.7 D.

A compromise provides a set of spectacle lens semifinished products, in which
at least four, preferably at least five, different types of the pairwise different types of the first series, which differ in terms of the form dimension of the at least one physical form feature of the form of the front surface thereof, have an actual surface power value of the front surface thereof of between 3.2 D and 6.7 D in relation to a standard refractive index of 1.53,
at least four, preferably at least five, different types of the pairwise different types of the second series, which differ in terms of the form dimension of the at least one physical form feature of the form of the front surface thereof, have an actual surface power value of the front surface thereof of between 3.2 D and 6.7 D in relation to a standard refractive index of 1.53, at least four, preferably at least five, different types of the pairwise different types of the third series, which differ in terms of the form dimension of the at least one physical form feature of the form of the front surface thereof, have an actual surface power value of the front surface thereof of between 3.2 D and 6.7 D in relation to a standard refractive index of 1.53, the form dimensions of the at least one physical form feature of the form of the front surfaces of the at least four, preferably at least five, different types of the first series and the form dimensions of the at least one physical form feature of the form of the front surfaces of the at least four, preferably at least five, different types of the second series and the form dimensions of the at least one physical form feature of the form of the front surfaces of the at least four, preferably at least five, different types of the third series are identical.

In order to cover a delivery range of semifinished products with an actual surface power value of the front surfaces thereof of, for example, between 0.5 D and 9.6 D in relation to a standard refractive index of 1.53, this then results in approximately 13 different semifinished product types.

It is advantageous to configure the grading of the semifinished products within a series to be as uniform as possible in order to ensure a uniform optical quality of the finished spectacle lenses over a delivery range which is as large as possible. In general, this is only possible within certain boundaries. Therefore, in a particularly advantageous embodiment, the invention provides for the first series and the second series and the third series each to have types of spectacle lens semifinished products, the front surfaces of which have a form feature with identical form dimensions, and for the difference between in each case one of the identical form dimensions or the inverse thereof and the in each case next-larger identical form dimension or the inverse thereof to be of equal size within a variance of 20%, preferably of 10%, most preferably of 5%.

Continuing the idea of uniform grading of the semifinished products within a series specified above, one variant of the invention provides for the at least one form feature to be an actual surface power and for the associated form dimension to be the associated actual surface power value in relation to a standard refractive index of 1.53 such that the first series and the second series and the third series each have types of spectacle lens semifinished products, the front surfaces of which have an actual surface power with identical actual surface power values in relation to a standard refractive index of 1.53, and for the difference between one of the identical actual surface power values in relation to the standard refractive index of 1.53 and the next-larger identical actual surface power value in relation to the standard refractive index of 1.53 to be less than 2.5 D. The limit of 2.5 D accounts for the requirement of a sufficient optical quality of the end product over the delivery range specified above, under the assumption that no further spectacle lens semifinished products are used in relation to the type deviating according to the invention.

In general, the quality of the end product can be increased if the aforementioned difference value is less than 2.3 D, more preferably less than 1.5 D, even more preferably less than 1.0 D. A maximum value of approximately 0.8 D was found to be advantageous if 13 different semifinished product types are used to cover a delivery range for semifinished products with an actual surface power value of the front surfaces thereof of, for example, between 0.5 D and 9.6 D in relation to a standard refractive index of 1.53.

As already explained above, the desirable number of different spectacle lens semifinished product types within a series constitutes a compromise between manufacturing requirements and optical requirements. Furthermore, the delivery range is decisive for the overall number of different spectacle lens semifinished product types.

A spectacle lens semifinished product set, which equally takes account of the aforementioned boundary conditions and is considered to be ideal by the inventors, is configured in such a way that at least ten, preferably at least eleven, more preferably at least twelve, most preferably at least thirteen, different types of the pairwise different types of the first series, which differ in terms of the form dimension of the at least one physical form feature of the form of the front surface thereof, have an actual surface power value of the front surface thereof of between 0.5 D and 9.60 D in relation to a standard refractive index of 1.53, and in that at least ten, preferably at least eleven, more preferably at least twelve, most preferably at least thirteen, different types of the pairwise different types of the second series, which differ in terms of the form dimension of the at least one physical form feature of the form of the front surface thereof, have an actual surface power value of the front surface thereof of between 0.5 D and 9.60 D in relation to a standard refractive index of 1.53, at least ten, preferably at least eleven, more preferably at least twelve, most preferably at least thirteen, different types of the pairwise different types of the third series, which differ in terms of the form dimension of the at least one physical form feature of the form of the front surface thereof, have an actual surface power value of the front surface thereof of between 0.5 D and 9.60 D in relation to a standard refractive index of 1.53, the form dimensions of the at least one physical form feature of the form of the front surfaces of the at least ten, preferably at least eleven, more preferably at least twelve, most preferably at least thirteen, different types of the first series and the form dimensions of the at least one physical form feature of the form of the front surfaces of the at least ten, preferably at least eleven, more preferably at least twelve, most preferably at least thirteen, different types of the second series and the form dimensions of the at least one physical form feature of the form of the front surfaces of the at least ten, preferably at least eleven, more preferably at least twelve, most preferably at least thirteen, different types of the third series are identical.

The method according to the invention for producing spectacle lenses comprises the following steps:

a) providing a set of spectacle lens semifinished products, which each have a back surface and a front surface with a spherical or rotationally symmetric aspherical, convex form, which has at least one physical form feature with an associated form dimension, comprising a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value of the front surface thereof of between 3.2 D and 6.7 D in relation to a standard refractive index of 1.53 and determined, in the case of a rotationally symmetric aspherical form of the front surface, at the center of symmetry thereof, a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof, a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof, wherein at least three different types of the pairwise different types of the second series have an actual surface power value of the front surface thereof of between 3.2 D and 6.7 D in relation to a standard refractive index of 1.53, at least three different types of the pairwise different types of the third series have an actual surface power value of the front surface thereof of between 3.2 D and 6.7 D in relation to a standard refractive index of 1.53, the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series are identical, b) receiving one of the spectacle lens semifinished products from the provided set of spectacle lens semifinished products, and c) machining the back surface of the received spectacle lens semifinished product.

Expressed differently, the provided set of spectacle and semifinished products consists of at least three series of spectacle lens semifinished products with spherical or rotationally symmetric aspherical front surfaces. The series of spectacle lens semifinished products differ pairwise in respect of the respective base material thereof. The base materials have different average refractive indices. Within an actual surface power value range of the front surface thereof of between 3.2 D and 6.7 D in relation to a standard refractive index of 1.53, each one of the series comprises at least three pairwise different types of spectacle lens semifinished products, the front surface forms of which having embodiments which are somehow different. Within this actual surface power value range of the front surface thereof of between 3.2 D and 6.7 D in relation to the standard refractive index of 1.53, the front surface forms of these at least three types are identical on a subarea (which subarea preferably comprises more than 40%, more preferably more than 50%, of the entire front surface) or on the entire front surface thereof for all of the at least three series.

According to the invention, the at least one form feature (R, R1, R2, . . . R20, $D_n$) is/are:

i) the actual curvature and/or
ii) the actual radius of curvature and/or
iii) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1-(1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, . . . are the coefficients of the correction polynomial.

In the method according to the invention for producing spectacle lenses, it is naturally possible to provide all of the above-described embodiment variants of sets of spectacle lens semifinished products in method step a). Reference is herewith expressly made to the above description of the properties thereof.

Further machining or finishing of the provided semifinished products usually requires a reproducible fixation or clamping of the spectacle lens semifinished products on a receptacle or on a holder in accordance with method step b). Within the scope of the present invention, this process is referred to as receiving. Receiving may comprise an application of a protective film onto the front surface to be contacted.

Receiving the semifinished products leads to a defined positional assignment between the spectacle lens semifinished product and the holder thereof (on which it is received). Then, an emerging "composite" of the carrier and the received spectacle lens semifinished product can, for example, be received on a machining machine in a defined, highly accurate and precise manner, for example on a milling machine, a turning machine and/or a polishing machine. Accordingly, a highly precise reception in a monitoring station for monitoring the manufacturing progress or machining progress is also possible. Usually, the spectacle lens semifinished product remains in its received state during a multiplicity of manufacturing steps or machining steps.

By way of example, the spectacle lens semifinished products can be received in a cohesive and/or force-fit manner. In this context, various approaches for receiving spectacle lens semifinished products or semifinished products can be gathered from, for example, U.S. Pat. No. 7,500,908. It is still conventional to receive spectacle lens semifinished products in suitable receptacles in a cohesive manner by means of metal alloys with a low melting point. This process is also referred to as application of a block piece by persons skilled in the art. In other words, the metal alloys with a low melting point serve as "adhesive" between the spectacle lens semifinished product, in particular the front side thereof, and the holder. Furthermore, it is known to affix or receive spectacle lens semifinished products for producing spectacle lenses in appropriate receptacles by means of organic adhesives.

Moreover, it is known to affix spectacle lens semifinished products for producing spectacle lenses in appropriate receptacles by means of a force fit. Force-fit receiving may, in particular, comprise the at least partial evacuation of a cavity between the spectacle lens semifinished product and a carrier or holder serving as receptacle. In this way, it is possible to generate negative pressure, in particular a vacuum, as a result of which the spectacle lens semifinished product may be held tightly and securely on the receptacle on account of the applied pressure difference. To the extent that the corresponding secured seat of the spectacle lens semifinished product on the receptacle is sufficiently well sealed, such a received state can be securely maintained for at least a certain amount of time.

Receiving spectacle lens semifinished products by the application of negative pressure has the substantial advantage that there is no need for additional media (metal alloys, adhesives or the like), as described in EP 0 857 993 A2. Accordingly, the outlay may be reduced; the disposal of potentially noxious substances is not required.

However, a pneumatic reception (sometimes also referred to as vacuum blocking) generally leads to increased outlay elsewhere. This is because, for example, a secure and tight fixation of the spectacle lens semifinished product on the carrier can only emerge if, where possible, only a small defined gap is formed between the contact surface (usually the front surface) of the spectacle lens semifinished product and a corresponding seat on the carrier. Expressed differently, this means that the seat of the carrier should be paired, where possible, with a contact surface contour, in particular with a contact surface curvature, of the spectacle lens semifinished product. Thus, for example, it is preferable if a spherical or rotationally symmetric aspherical surface of the seat of the carrier is matched to a spherical or rotationally symmetric contact surface of the spectacle lens semifinished product. This may contain the case where both spherical or rotationally symmetric aspherical surfaces comprise radii of curvature that are matched to one another, as is described in, for example, U.S. Pat. Nos. 6,089,713, 3,134,208, 4,089,102, DE3924078A1 or DE2531134A1.

In general, it is not necessary for the receptacle to be brought to abutment in a form-complementing manner over the entire front surface of the semifinished product to be received. This applies both for the case of cohesive receiving, in particular blocking by means of a metal alloy with a low melting point applied between the receptacle and the semifinished product front surface or by means of an organic adhesive applied between the receptacle and the semifinished product front surface, and for the case of force-fit receiving, in particular vacuum blocking by means of negative pressure between the receptacle and the semifinished product front surface.

Therefore, in a particular configuration of the invention, provision is made for, in step b), the receiving of the spectacle lens semifinished product from the provided set of spectacle lens semifinished products to be carried out by means of a receiving device which has an embodiment complementary in terms of form only to one portion of the form of the front surface. The portion may comprise at least 40%, preferably at least 50%, more preferably at least 60%, most preferably at least 70%, of the front surface of the received spectacle lens semifinished product. It was found to be sufficient if the portion comprises between 40% and 80%, preferably between 50% and 80%, more preferably between 60% and 80%, most preferably between 70% and 80% of the front surface of the received spectacle lens semifinished product.

As a matter of principle, when compared to conventional cohesive types of cohesive blocking, a receiving device for vacuum blocking, which is preformed in a form-complementary manner, may lead to increased outlay. In other words, it is desirable, namely for reasons of the functional reliability when receiving, to provide a specially adapted receiving device in the form of a seat or a carrier for each contact surface form of a spectacle lens semifinished product. Stated more simply, it would be necessary to keep available a seat or appropriately adapted carrier in accordance with the given radius of curvature of the contact surface for each spectacle lens semifinished product type of the above-described type, which needs to be received, with the seat or carrier comprising a receiving radius adapted thereto. For cohesive blocking, a receiving device with a form-complementary embodiment is, in particular, not mandatory, even though it is by all means desirable for at least a portion.

Instead of a receiving device for a force-fit reception of a spectacle lens semifinished product, which has a contour pre-adapted in a form-complementary manner to the front surface of the semifinished product to be received, it is also possible to use a receiving device with a contour that is pre-adaptable in a form-complementary manner to the front surface of the semifinished product to be received for the purposes of realizing the present invention. By way of example, this can be carried out by means of ring-shaped abutment elements which are displaceable in the axial direction, as is described in, for example, U.S. Pat. No. 6,089,713 or JP3121763A.

Extensive form-fit receiving of the front surface of a spectacle lens semifinished product is not mandatory in the case of a pneumatic receiving device. However, it was found that a significantly greater holding force between receptacle and spectacle lens semifinished product can be achieved in the receiving devices, described in documents U.S. Pat. Nos. 6,089,713, 3,134,208, 4,089,102, DE3924078A1, DE2531134A1 and JP3121763A, with an abutment surface embodied in a form-complementary manner to an extensive section of the front surface of the semifinished product to be held than in the case of simple suction carriers, which merely have an external, generally ring-shaped abutment surface, which seals to the surroundings, for the spectacle lens semifinished product.

If the suction carrier is embodied to that end, it is particularly preferable to hold the spectacle lens semifinished product stable without power after producing the negative pressure. Expressed differently, this means that no further energy needs to be supplied to securely hold the spectacle lens semifinished product on the suction carrier once it has been received. To this end, suitable structural measures, in particular suitable measures for sealing on the receiving seat and on the suction carrier itself, may be provided. To the extent that the spectacle lens semifinished product abuts sufficiently tightly on the receiving seat, for example on a surrounding sealing surface, and to the extent that a negative pressure line on the suction carrier, which is contactable for generating the negative pressure, is sufficiently sealed to the outside, the spectacle lens semifinished product can also remain on the suction carrier for a relatively long time in a defined, tight and secure manner. In other words, it is possible to form a composite consisting of the suction carrier and the spectacle lens semifinished product, which is independent and stable. By way of example, the composite of suction carrier and spectacle lens semifinished product may be moved and implemented in a manufacturing installation, without tracking of negative pressure lines or the like being required.

By way of example, the negative pressure between the receiving seat and the spectacle lens semifinished product can be generated by evacuating a space originally filled by a fluid (especially by air) between the contact surface of the spectacle lens semifinished product and the receiving seat. To the extent that this disclosure refers to a vacuum in this context, this does not necessarily mean that an absolute vacuum is generated. Rather, it is regularly sufficient to generate a defined negative pressure or defined pressure difference between an ambient pressure and the pressure in the "vacuum chamber" between the contact surface of the spectacle lens semifinished product and the receiving seat.

By way of example, machining step c) may comprise grinding processes and/or milling processes and/or deformation processes. Furthermore, machining the received spectacle lens semifinished product may comprise polishing processes. The machining can consist of a form-giving production of a standardized back surface or the form-giving production of a surface configuration of the back surface calculated individually for the subsequent user. In particular, prescription values and individual user information, for example of the type described in EP 0 857 993 A2, which were established by the optician or ophthalmologist may be included in both preceding cases.

In addition, or as an alternative, to the above-described form-giving processes, the machining step may also comprise the application of functional layers of the type described in the introductory part of the description.

During the machining of the spectacle lens semifinished product, the latter can remain in its received state, at least for some of the time, preferably almost permanently. In particular, the spectacle lens semifinished product can be redeployed between various machining stations in the received state. Furthermore, in the received state, the spectacle lens semifinished product may also be fed to at least one monitoring station or testing station in order, for example, to monitor the machining progress. Furthermore, quality control can be simplified in this manner.

The invention consists furthermore of the proposed use of a set of spectacle lens semifinished products, in particular of the type described above, in a method for producing spectacle lenses, in particular in one of the types described above, wherein the spectacle lens semifinished products each have a front surface with a spherical or rotationally symmetric aspherical, convex form, which has at least one physical form feature with an associated form dimension, comprising a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value of the front surface thereof of between 3.2 D and 6.7 D in relation to a standard refractive index of 1.53 and determined, in the case of a rotationally symmetric aspherical form of the front surface, at the center of symmetry thereof, a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof, a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof, wherein at least three different types of the pairwise different types of the second series have an actual surface power value of the front surface thereof of between 3.2 D and 6.7 D in relation to a standard refractive index of 1.53, wherein at least three different types of the pairwise different types of the third series have an actual surface power value of the front surface thereof of between 3.2 D and 6.7 D in relation to a standard refractive index of 1.53, wherein the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series are identical.

According to the invention, the at least one form feature (R, R1, R2, R20, $D_n$) is/are:
i) the actual curvature and/or
ii) the actual radius of curvature and/or
iii) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, . . . are the coefficients of the correction polynomial.

The problem of the invention, posed at the outset, is solved in its entirety by the above-described use of a set of spectacle lens semifinished products in a method for producing spectacle lenses.

Moreover, the invention consists of the provision of an apparatus for producing spectacle lenses, in particular for carrying out a method of the type described above, comprising:

a) a provision device for providing a set of spectacle lens semifinished products, in particular of the type described above, wherein the spectacle lens semifinished products each have a back surface and a front surface with a spherical or rotationally symmetric aspherical, convex form, which has at least one physical form feature with an associated form dimension, comprising a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value of the front surface thereof of between 3.2 D and 6.7 D in relation to a standard refractive index of 1.53 and determined, in the case of a rotationally symmetric aspherical form of the front surface, at the center of symmetry thereof, a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof, a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof, wherein at least three different types of the pairwise different types of the second series have an actual surface power value of the front surface thereof of between 3.2 D and 6.7 D in relation to a standard refractive index of 1.53, wherein at least three different types of the pairwise different types of the third series have an actual surface power value of the front surface thereof of between 3.2 D and 6.7 D in relation to a standard refractive index of 1.53, wherein the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series are identical.

b) a receiving device for receiving one of the spectacle lens semifinished products from the provided set of spectacle lens semifinished products, c) a machining device for machining the back surface of the received spectacle lens semifinished product.

According to the invention, the at least one form feature (R, R1, R2, ... R20, $D_n$) is/are:

i) the actual curvature and/or
ii) the actual radius of curvature and/or
iii) the vertex curvature (ρ) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, ρ is the vertex curvature and k is the conic constant of the conic section, and A4, A6, ... are the coefficients of the correction polynomial.

The problem of the invention, posed at the outset, is solved in its entirety by the above-described apparatus according to the invention for producing spectacle lenses.

By way of example, the provision device can be a store, in which the different semifinished products of the set are stored and from which one of the spectacle lens semifinished products of the set may be requested to be received on the front surface thereof and to be machined on the back surface. By way of example, the provision device can also be a database which provides information in relation to individual semifinished product types and from where these can be obtained, and by means of which one of the spectacle lens semifinished products of the set may be requested to be received on the front surface thereof and to be machined on the back surface.

As already described above, the receiving device may establish a cohesive and/or force-fit and/or interlocking connection with the spectacle lens semifinished product. The receiving device may be configured as a blocking device which is able to establish a cohesive connection between the receiving device and the front surface of the spectacle lens semifinished product by means of a metal alloy with a low melting point introduced between the receiving device and the semifinished product front surface or by means of an organic adhesive applied between the receiving device and the semifinished product front surface. The receiving device may also be embodied as a negative pressure suction device or vacuum suction device, which is able to establish a force-fit connection by means of a negative pressure in a cavity between the receiving device and the semifinished product front surface.

The machining device may comprise one or more milling tools and/or one or more turning tools and/or one or more grinding tools and/or one or more polishing tools. Additionally, or alternatively, the machining device may comprise one or more deposition devices for applying functional layers. There may be one or more deposition devices, such as, for example, immersion coating devices or spin-on or spin coating devices, for wet chemical application of one or more functional layers. Furthermore, it is possible for use to be made of one or more vacuum coating devices, such as, for example, vapor deposition devices, in particular evaporation devices, sputtering devices or chemical vacuum reaction devices.

Finally, the invention consists of a computer-implemented method for configuring a set of spectacle lens semifinished products, in particular a set of semifinished products according to one of the types described above, wherein the spectacle lens semifinished products each have a front surface with a spherical or rotationally symmetric aspherical, convex form, which has at least one physical form feature with an associated form dimension, wherein the set of spectacle lens semifinished products comprises a first series of spectacle lens semifinished products made of a base material with a first average refractive index and a second series of spectacle lens semifinished products made of a base material with a second average refractive index which differs from the first average refractive index and a third series of spectacle lens semifinished products made of a base material with a third average refractive index which differs from the first average refractive index ($n_{d4}$) and from the second average refractive index, wherein the first series has pairwise different types of spectacle lens semifinished products, which differ in terms of the form dimension of the at least one physical form feature of the form of the front surface thereof, and wherein the second series has pairwise different types of spectacle lens semifinished products, which differ in the form dimension of the at least one physical form feature of the form of the front surface thereof and wherein the third series has pairwise different types of spectacle lens semifinished products, which differ in the form feature of the at least one physical form feature of the form of the front surface thereof.

The computer-implemented method according to the invention is characterized by the following step:

a) equalizing the form dimensions of the at least one physical form feature of the form of the front surfaces of the different types of the first series and the form dimensions of the at least one physical form feature of the form of the front surfaces of the different types of the second series and the form dimensions of the at least one physical form feature of the form of the front surfaces of the different types of the third series.

Expressed differently, equalizing the form dimensions is understood to mean the bringing into correspondence of the form dimensions such that the set of spectacle lens semifinished products consists of at least two series of spectacle lens semifinished products with spherical or rotationally symmetric aspherical front surfaces, the series of spectacle lens semifinished products differ in terms of their respective base material, the base materials have different average refractive indices, each one of the series comprises at least two pairwise different types of spectacle lens semifinished products, the front surface forms of which having a somewhat different embodiment, and the front surface forms of these at least two types are identical on a subarea (which comprises preferably more than 40%, more preferably more than 50%, of the entire front surface) or on the entire front surface for all of the at least three series.

According to the invention, the at least one form feature (R, R1, R2, . . . R20, $D_n$) is/are:
 i) the actual curvature and/or
 ii) the actual radius of curvature and/or
 iii) the vertex curvature (ρ) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, ρ is the vertex curvature and k is the conic constant of the conic section, and A4, A6, . . . are the coefficients of the correction polynomial.

The problem of the invention, posed at the outset, is solved in its entirety by the above-described computer-implemented method according to the invention for configuring a set of spectacle lens semifinished products.

A particularly advantageous embodiment of the computer-implemented method according to the invention consists of the at least one form feature being an actual surface power and of the associated form dimension being the associated actual surface power value in relation to a standard refractive index of 1.53 such that the first series and the second series of spectacle lens semifinished products each have types of spectacle lens semifinished products, the front surfaces of which have an actual surface power with identical actual surface power values in relation to a standard refractive index of 1.53, and of the equalization of the actual surface power values of the front surfaces of the different types of the first series in relation to the standard refractive index of 1.53 and the actual surface power values of the front surfaces of the different types of the second series in relation to the standard refractive index of 1.53 being carried out in such a way that the difference between one of the identical actual surface power value in relation to the standard refractive index of 1.53 and the next larger identical actual surface power value in relation to the standard refractive index of 1.53 is less than a predetermined threshold and/or identical to a fixedly predetermined difference value within a variance range of 20%, preferably 15%, more preferably 10%, most preferably 5%.

In accordance with the explanations above, the advantage of this configuration rule lies in the fact that a largely uniform grading is generated between the semifinished products of a series, enabling a largely homogeneous quality distribution in respect of the optical properties of the finished spectacle lenses over the entire delivery range thereof.

According to the invention, the above-described method for configuring a set of semifinished products for producing spectacle lenses, and the variants thereof for carrying out the method steps thereof, may be present in the form of a computer program with program code if the computer program is loaded onto a computer and/or executed on a computer.

In particular, the invention provides for the above-described method for configuring a set of semifinished products for producing spectacle lenses, and the variants thereof for carrying out the method steps thereof, to be able to be present in the form of a computer-readable storage medium with a computer program with program code in order to load the computer program onto a computer and/or execute it on a computer.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
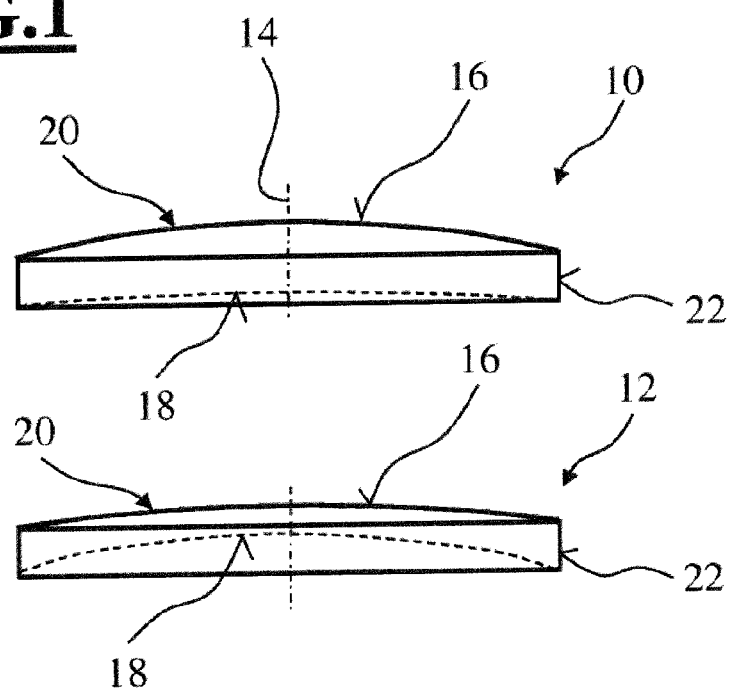
FIG. 1 shows a simplified schematic side view of two spectacle lens semifinished products for producing spectacle lenses.

FIG. 1 elucidates, in a much simplified manner on the basis of two side views, possible configurations of spectacle lens semifinished products for producing spectacle lenses, as are used within the scope of the present invention. A spectacle lens semifinished product, denoted by 10, may be used in an exemplary manner for producing a so-called positive lens. A spectacle lens semifinished product, denoted by 12, may be used in an exemplary manner for producing a so-called negative lens.

In the embodiment, the spectacle lens semifinished products 10, 12 have a rotationally symmetric embodiment about an axis of rotation 14. Furthermore, the spectacle lens semifinished products 10, 12 have a front surface 16. The front surface 16 has already been completed. Changes in the curvature for changing the optical effect or the optical properties for an adaptation to the requirements of the subsequent spectacle wearer are only undertaken on the back surface 18, situated opposite the front surface 16, of the spectacle lens semifinished products 10, 12. Usually, the front surface 16 is a spherical surface. Rotationally symmetric aspherical front surfaces are also admissible within the scope of the present invention. The respective front surface 16 has a specific curvature which, in the present embodiment, is identified by the radius of curvature 20.

A positive lens which is producible from the spectacle lens semifinished product 10 generally has a convex front surface 16 with a curvature that is greater than a concave curvature of the back surface 18. A negative lens which is producible from the spectacle lens semifinished product 12 generally has, on its convex front surface 16, a curvature that is generally less than the curvature of the concave back surface 18. The spectacle lens semifinished products 10, 12 are produced from an organic material (plastic) in the embodiment. Spectacle lens semifinished products made of mineral glasses or other inorganic materials are also possible. By way of example, known materials for organic spectacle lenses include those with the trade names CR 39, MR 8, MR 7, CR 330 and MR 174. Other materials for organic and mineral spectacle lenses are specified in the introductory part of the description. However, Table 1 specified in the introductory part of the description only comprises a selection of a multiplicity of materials.

In addition to the front surface 16 and the back surface 18, the spectacle lens semifinished products 10, 12 have an edge surface 22, which is usually embodied as a cylinder surface. It is therefore often also referred to as the cylindrical edge surface. It is understood that the configurations of the spectacle lens semifinished products 10, 12, elucidated on the basis of FIG. 1, are merely of an exemplary nature. In general, the edge surface 22 can be configured as a circumferential surface with any form.

As already described in detail above, so-called semifinished products, that is, blanks 10, 12, in which the front surface 16, 18 has been finished in terms of machining and in which the back surface 16, 18 is subject to subsequent form-imparting processing for further adaptation to the optical requirements of the subsequent spectacle wearer, are blocked or affixed in receptacles such that these can be received in processing machines in a suitable manner.

Figure 2:
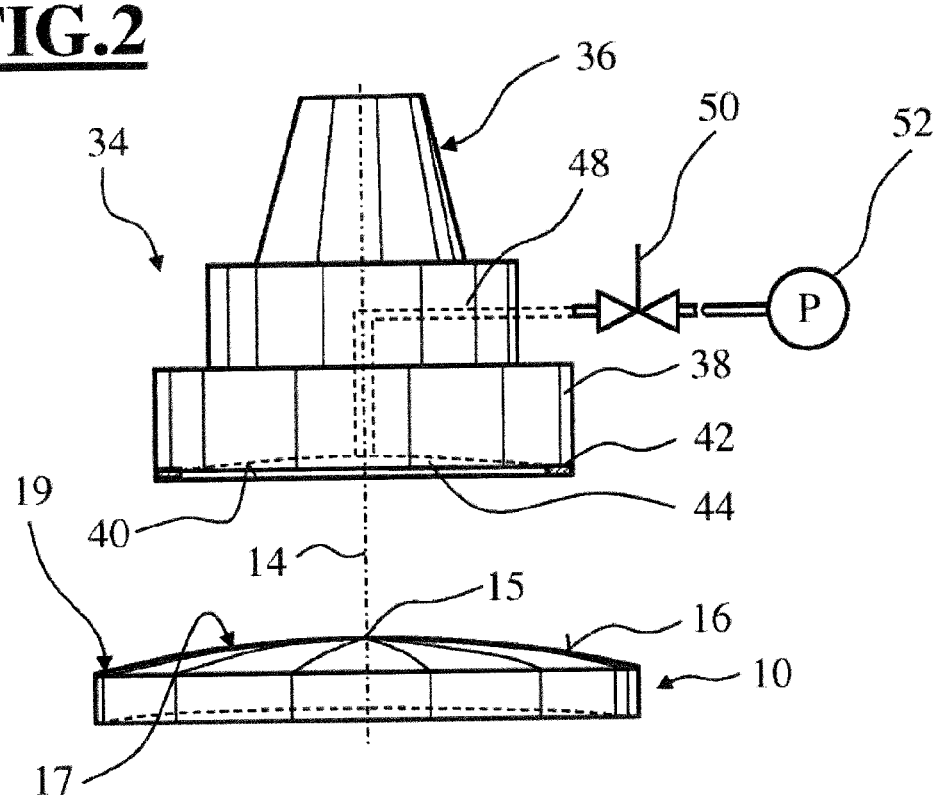
FIG. 2 shows a simplified schematic side view of a further spectacle lens semifinished product for producing spectacle lenses and a receptacle with a receiving seat adapted to the spectacle lens semifinished product.

In a schematic, much simplified side view, FIG. 2 elucidates a receiving device 34 which is embodied for receiving a spectacle lens semifinished product 10. In the example, the receiving device 34 is embodied as a suction carrier or vacuum carrier. The receiving device 34 is embodied to receive the spectacle lens semifinished product 10 on a defined contact surface. By way of example, the contact surface can be the entire front surface 16. In the case shown in FIG. 2, the contact surface merely comprises a central front surface section 17 which is point symmetrical in relation to a penetration point 15 of the rotational axis or axis of symmetry 14 of the spectacle lens semifinished product 10 through the front surface 16.

A protective film is often applied to the contact surface prior to receiving the spectacle lens semifinished product 10 on the receiving device 34. This can avoid damage of the front surface 16 while being received and while being affixed during the subsequent machining. In FIG. 2, the protective film is identified by the reference numeral 19.

The process of receiving or fixing the spectacle lens semifinished product 10 on the receiving device 34 is denoted as blocking, particularly when using metal alloys with a low melting point as a connection medium or when using a suction or vacuum carrier. A composite of the receiving device 34 and the spectacle lens semifinished product 10 received thereon may emerge in the blocked state of the spectacle lens semifinished product 10. This composite allows secure handling and, in particular, a precise reception of the spectacle lens semifinished product 10 for further machining steps.

In the embodiment, the receiving device 34 comprises a shaft 36, which is embodied to receive the receiving device 34 in processing machines, testing machines or similar devices of an installation for producing spectacle lenses. Furthermore, in the shown arrangement, the receiving device 34 comprises a contact section 38, which is embodied to receive the contact surface 17 or front surface 16 of the spectacle lens semifinished product 10.

In the example, the contact section 38 has a receptacle depression which is referred to as receiving seat 40 below. A seal 42 is received on the contact section 38, in particular at the end thereof facing the spectacle lens semifinished product 10. It is not absolutely mandatory for the front surface 16 of the spectacle lens semifinished product 10 to abut on the receiving seat 40 of the contact section 38 in the received state. However, a sealing abutment of the sealing ring 42 on the front surface 16 is desirable. In this way, a cavity 44 may emerge between the receiving seat 40 and the front surface 16, with a negative pressure or vacuum being generable in the cavity.

To the extent that the cavity 44 is sufficiently sealed by the abutment of the spectacle lens semifinished product 10 on the sealing ring 42, the spectacle lens semifinished product 10 can be securely held on the contact section 38 purely by the negative pressure in the cavity 44. In this way, a force-fit reception of the spectacle lens semifinished product 10 on the contact section 38 may be ensured. Compared with known approaches for cohesively connecting the spectacle lens semifinished product 10 to the contact section 38, this has various advantages. In particular, the provision, handling and disposal of an adhesive means between the contact section 38 and the spectacle lens semifinished product 10 can be avoided.

The cavity 44, which may also be referred to as a chamber, is connectable to a pump 52 by way of a line 48 for the purposes of generating the negative pressure or vacuum in the cavity 44. The pump 52 can also be referred to as vacuum pump. Air can be drawn out of the cavity 44 by means of the pump 52 when the spectacle lens semifinished product 10 abuts sufficiently tightly on the sealing ring 42. Preferably, the line 48 is able to be blocked in a sealing manner. To this end, provision can be made of, for example, a valve 50, which is depicted symbolically in FIG. 2. Preferably, the line 48 is able to be blocked in such a way that the carrier 34 is detachable from the pump 52. To the extent that the cavity 44 is sufficiently sealed, the spectacle lens semifinished product 10 can be held independently and permanently on the contact section 38. In particular, no permanent or sporadic energy supply for securing the tight fit is required. Conversely, the spectacle lens semifinished product 10 can easily be detached from the contact section 38, for example by virtue of pressure equalization being brought about by way of the line 48.

In order to ensure a reproducible and actionable reception of the spectacle lens semifinished product 10 on the contact section 38, it is advantageous to generate a gap which is as defined as possible between the front surface 16 and the receiving seat 40, the gap defining the cavity 44 in the blocked state. For this reason, it is advantageous if the receiving seat 40 has a form which is adapted to the form of the front surface 16, at least in the region of the contact surface 17. In particular, it may be advantageous if the receiving seat 40 and the front surface 16 have substantially corresponding curvatures or radii of curvature. The gap or the cavity 44 may emerge by an appropriate offset. In particular, it is preferable if an appropriate receiving seat 40 or an appropriate contact section 38 is kept available for every conceivable form or configuration of the front surface 16.

Figure 3:
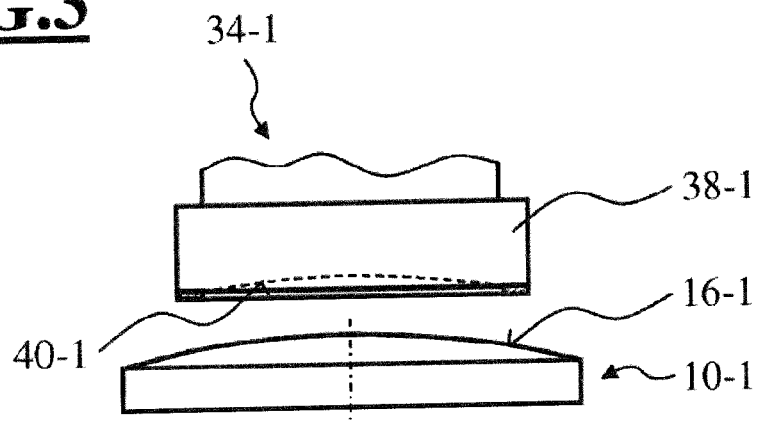
FIG. 3, FIG. 4 and FIG. 5 show simplified schematic side views of pairs of spectacle lens semifinished products and contact sections with receiving seats, which are adapted to corresponding contact surfaces of the spectacle lens semifinished products.
Figure 4:
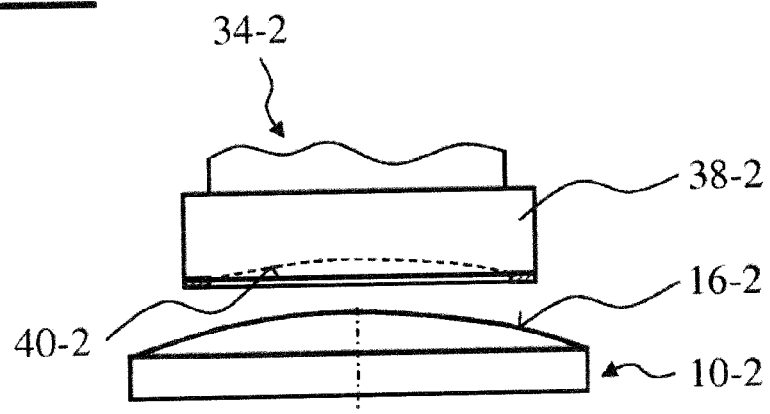
Figure 5:
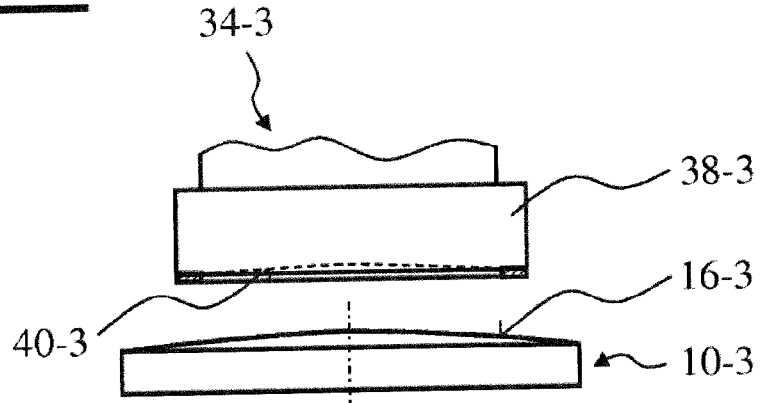

In this context, FIGS. 3, 4 and 5 elucidate various pairs of semifinished products 10-1, 10-2, 10-3 with, matched to the front surfaces 16-1, 16-2, 16-3 thereof, contact sections 38-1, 38-2, 38-3 of receiving devices 34-1, 34-2, 34-3 of the type shown in FIG. 2. The contact sections 38-1, 38-2, 38-3 have depressions or receiving seats 40-1, 40-2, 40-3, which are adapted in a suitable manner to the configuration of the front surface 16-1, 16-2, 16-3. In particular, the receiving seats 40-1, 40-2, 40-3 and the front surfaces 16-1, 16-2, 16-3 may have substantially corresponding radii of curvature. This can bring about secure fixation of the spectacle lens semifinished products 10-1, 10-2, 10-3.

However, as the number of differently configured front surfaces 16-1, 16-2, 16-3 increases, the need for appropriately adapted contact sections 38-1, 38-2, 38-3 would increase accordingly. Thus, as the inhomogeneity or diversity of spectacle lens semifinished products 10, 12 increases in respect of the front surface configuration thereof, so does the outlay for providing adequate contact sections 38 or receiving devices 34 provided therewith.

Like in the depicted case, each one of the contact sections 38-1, 38-2, 38-3 in FIGS. 3, 4 and 5 may also be a constituent of an independent carrier 34-1, 34-2, 34-3, cf., also, FIG. 2. Conversely, it is however also conceivable to embody the contact sections 38-1, 38-2, 38-3 as adapters and therefore fasten these to a corresponding carrier 34 where necessary.

The fact that it is necessary to have a receiving device adapted to the front surface geometry of the spectacle lens semifinished product for ensuring a secure fixation of the spectacle lens semifinished product when the back surface thereof is machined not only applies to the case, discussed in detail above, where use is made of a vacuum blocker 34 as a receiving device for receiving a spectacle lens semifinished product 10, but also applies in general. However, in view of the very inhomogeneous supply of semifinished products for producing spectacle lenses, in particular varifocal lenses and similarly complex lenses, at the time of the invention, only a few spectacle lens manufacturers are able to store receiving devices by means of which the plurality of these spectacle lens semifinished products may be held.

Figure 6:
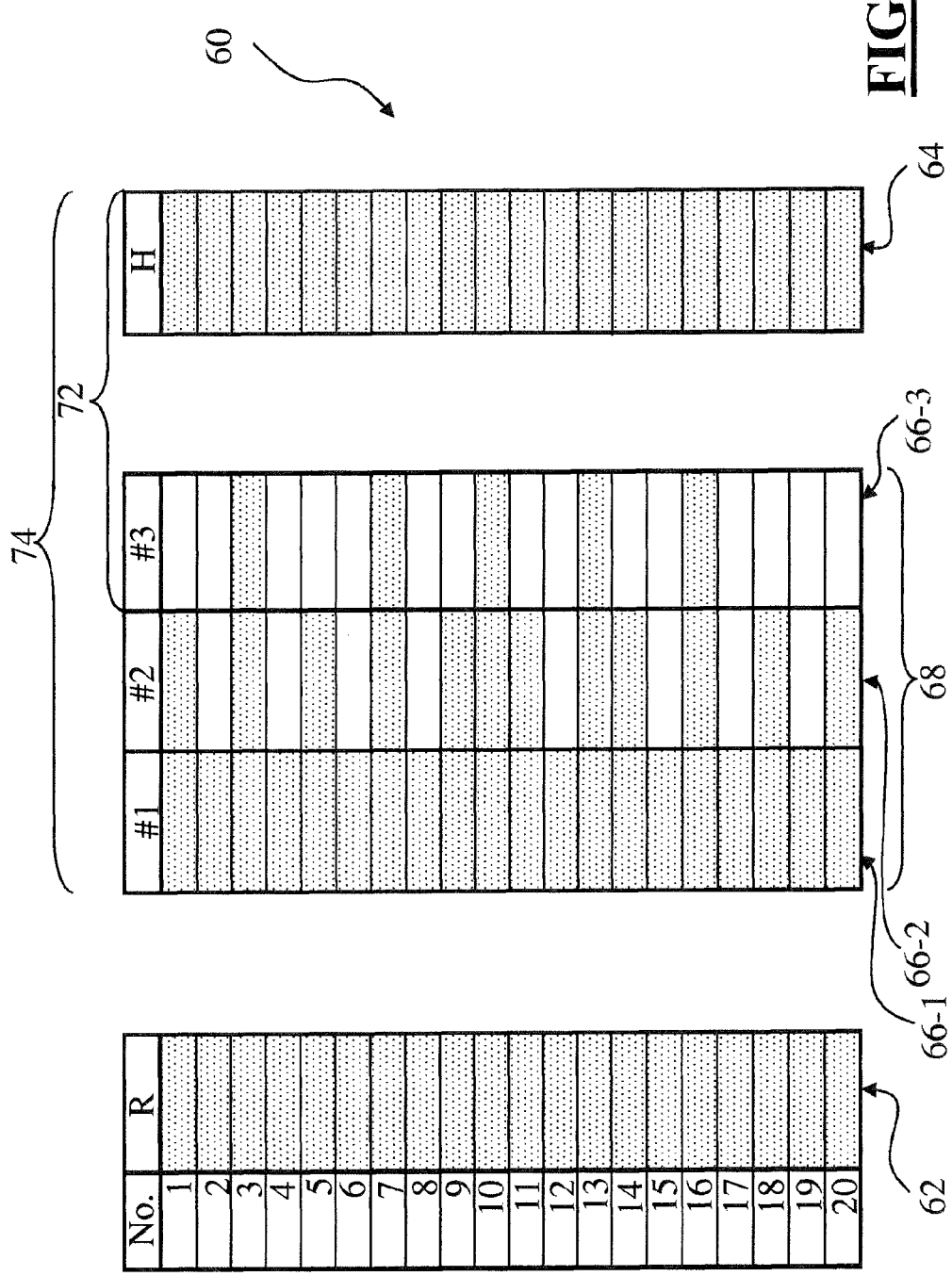
FIG. 6 shows a simplified schematic tabular chart for elucidating possible compositions and pairs of sets of spectacle lens semifinished products and a set of carriers or contact sections.

Therefore, the invention proposes to globally define front surface configurations, in particular radii of curvature for contact surfaces of the front surfaces of spectacle lens semifinished products 10, 12, such that this results in a manageable amount of different contact surface geometries. Such a concept is elucidated on the basis of the chart-like display shown in FIG. 6. FIG. 6 shows an assignment of spectacle lens semifinished product types, and hence corresponding receiving device types, to a global definition or a global standardization of physical form features, in particular a global definition of radii of curvature for contact surfaces of the spherical front surfaces of the spectacle lens semifinished products 10, 12. This once again expressly clarifies that the whole front surface or only a portion of the front surface may serve as a contact surface. Instead of the spherical form, the front surface can also have a rotationally symmetric aspherical embodiment. Furthermore, this clarifies that a spectacle lens semifinished product type is determined by the form dimension of the form feature thereof. This means that, in the present embodiment, a spectacle lens semifinished product type is defined by the dimension of the radius of the spherical front surface thereof.

The assignment table is denoted by 60 overall. A column denoted by 62 elucidates—merely schematically—set values for radii of curvature or similar physical form features which are denoted by R1 to R20 in accordance with a line enumeration. As it were, the radii R1 to R20 defined in column 62 represent a maximum amount, from which appropriate representatives may be selected when defining spectacle lens semifinished product types of a set. For reasons of simplicity, the assumption is made that the corresponding value of the respective radius R1 to R20 increases from top to bottom in the column 62, that is, with increasing line number.

It is preferable for a corresponding contact section 38 or a receiving device 34 provided with a contact section 38 to be provided for each radius R1 to R20 in accordance with column 62, the receiving seat 40 of which contact section being configured to receive a contact face with the radius of curvature R1 to R20, cf., also, FIG. 2 to FIG. 5. In the assignment table 60, a column denoted by 64 elucidates a corresponding set of receiving devices 34.

To the extent that the global definition 62 of radii R1 to R20 is now used as "input variable" when configuring front surface geometries of spectacle lens semifinished products, the fact that emerging semifinished products 10, 12 may be blocked and machined as desired is automatically ensured.

In FIG. 6, columns denoted by 66-1, 66-2, 66-3 elucidate different series of spectacle lens semifinished products 10, 12 which were selected in accordance with the global convention or definition of the radii R1 to R20. Accordingly, each series comprises a multiplicity of spectacle lens semifinished product types which are set by the radii of curvature of the front surfaces of the individual spectacle lens semifinished products.

It is understood that the number of different radii R1 to R20, predefined in accordance with the global definition 62, is merely selected in an exemplary fashion for illustrative purposes. In general, it is conceivable for the global definition 62 to comprise, for example, between 5 and 25 different radii. In particular, the global definition 62 may comprise approximately 10 to 20 different radii.

The different series 66-1, 66-2, 66-3 differ from one another in respect of the material thereof and hence in respect of the average refractive index thereof. The various series 66-1, 66-2, 66-3 may also differ from one another in view of other optical properties. In particular, the series, or else individual semifinished products within a series, may have one or more coatings. However, all that is decisive in the present case is the material of the carrier or of the substrate, which is referred to as base material within the scope of the present description.

There may be differences in view of the demand on part of the patient or customer between the series 66-1, 66-2, 66-3. By way of example, the series 66-1 according to the first column #1 may be a series of semifinished products 10, 12 which is very much in demand. The semifinished products of the series 66-2 according to the second column #2 have a lower demand than the semifinished products 66-1 according to the first column. The semifinished products of the series 66-3 according to the third column #3 have an even lower demand than the semifinished products 66-2 according to the second column #2. Furthermore, radii of average size, that is, corresponding to numbers R7 to R14, are more in demand than small or large radii R1 to R6 and R15 to R20.

Accordingly, it may be desirable to make use of the smallest spread or grading between the radii R1 to R20 in the series 66-1. In other words, the series 66-1 may, for example, comprise a set of semifinished product types characterized by the radii R1 to R20 which corresponds to the maximum available global set in accordance with column 62. This ensures a fine gradation. Regularly, only comparatively few form-imparting machining steps of the back surfaces are required for generating desired optical properties By contrast, the series denoted by 66-3 in FIG. 6 comprises a significantly reduced number of spectacle lens semifinished product types (marked fields in line nos. 3, 7, 10, 13, 18 in column 66-3), which is selected as a subset of the maximum available number of radii R1 to R20 or spectacle lens semifinished product types in column 62. In this way, the outlay for generating the semifinished products 10, 12 may be limited. Conversely, an increased machining outlay may be accepted in order to generate desired optical properties when proceeding from only a restricted number of spectacle lens semifinished product types.

The column denoted by 66-2 in FIG. 6 relates to spectacle lens semifinished products 10, 12 for which there is, for example, average demand. Therefore, it may be advantageous to have a finer grading for specific regions, in particular for specific regions of radius of curvature, than for other regions, in particular than edge regions of the column 62. Usually, the demand also varies within a series 66 of spectacle lens semifinished product types depending on the optical correction obtainable on the basis of the spectacle lens semifinished product type. Therefore, it may be advantageous to define spectacle lens semifinished product types of a series 66, which are subject to a higher demand (in relation to the series), with a smaller increment, cf., for example, the mid-section in the series 66-2.

A set 68 can be formed from a plurality of series 66-1, 66-2, 66-3. Accordingly, the set 68 of spectacle lens semifinished products comprises a plurality of series 66-1, 66-2, 66-3, which each in turn comprise a plurality of spectacle lens semifinished product types No. 1 to 20, which, themselves, in turn comprise a plurality of individual spectacle lens semifinished products. The individual series differ in the base material of the spectacle lens semifinished products. In the present case, the individual spectacle lens semifinished product types No. 1 to 20 differ in terms of the radius of curvature R1 to R20 thereof. That is, all spectacle lens semifinished products of one spectacle lens semifinished product type No. 1, No. 2, . . . No. 20 have the same radius of curvature R1, R2, . . . R20. It is irrelevant whether or not individual ones of the spectacle lens semifinished products of a type and/or of a series, or a plurality thereof, are coated.

Equally, it is ensured that each spectacle lens semifinished product within the series 66-1, 66-2, 66-3 of the set 68 is subject to the global definition 62 and therefore can be received, in particular blocked, by a receiving device 34, in particular a contact section 38 in accordance with the set 64 of receiving devices 34.

It may furthermore be advantageous to form at least one pair 72 of a series 66-1, 66-2, 66-3 of semifinished products 10, 12 and the set 64 of receiving devices 34 or correspondingly associated contact sections 38. Combining in pairs 72 ensures that a suitable receiving device 34 or suitable contact section 38 of the set 64 is available for each spectacle lens semifinished product type of the series 66-1, 66-2, 66-3.

Furthermore, it may be recommendable to form a pair 74 which comprises the set 68 of series 66-1, 66-2, 66-3 of spectacle lens semifinished product types No. 1, No. 2, . . . No. 20 and the set 64 of receiving devices 34 assigned thereto. The pairing 74 also ensures that each spectacle lens semifinished product type No. 1, No. 2, . . . No. 20 may be blocked, handled and machined in a suitable manner.

Figure 7:
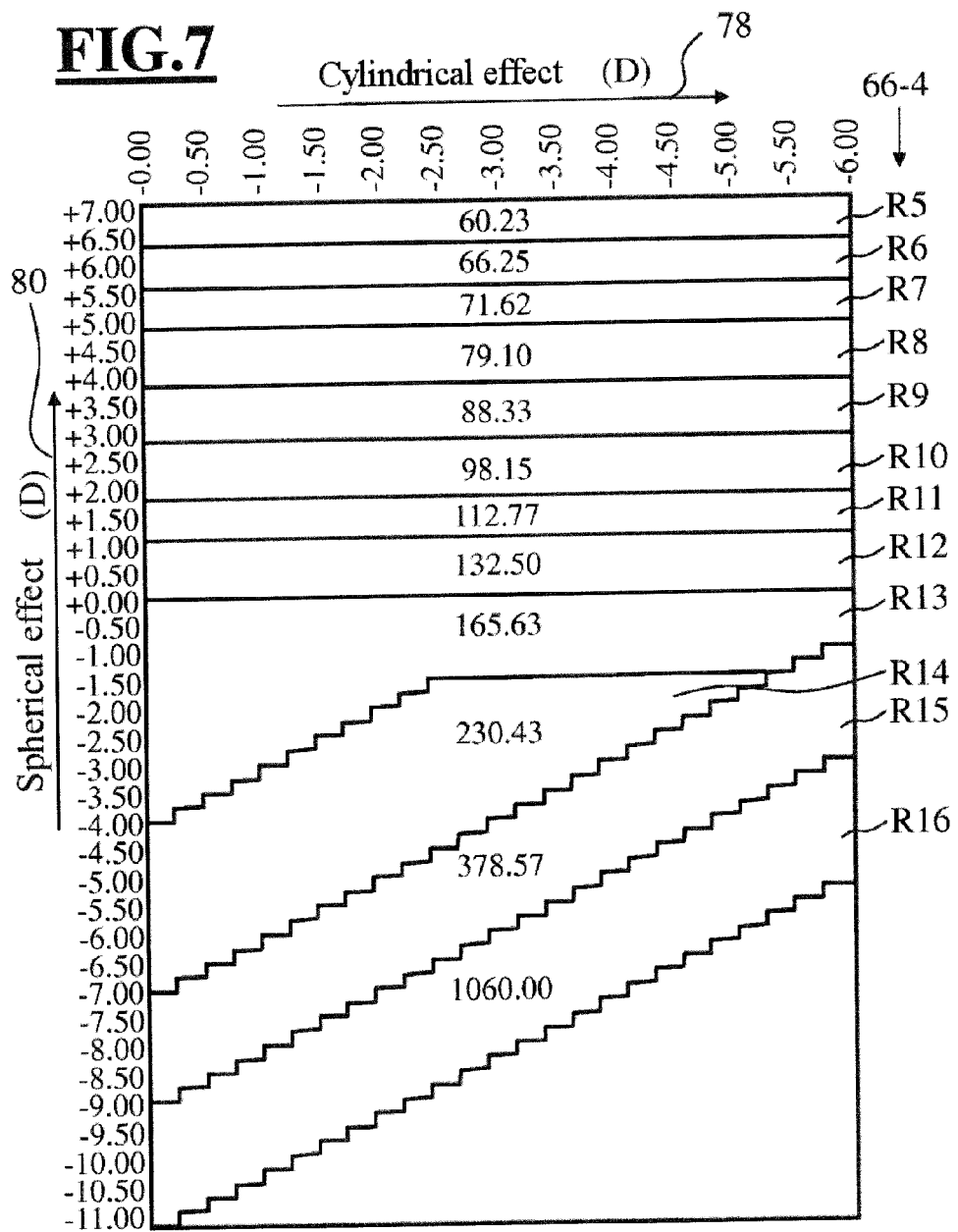
FIG. 7 shows a schematic illustration of an assignment of spectacle lens semifinished product types, which each have a standardized physical form feature in the form of a radius of curvature of the front surface of the spectacle lens semifinished products consisting of a base material of the respective spectacle lens semifinished product types with an average refractive index of 1.6, to predetermined regions of optical corrections which are generable on the basis of the spectacle lens semifinished product types.
Figure 8:
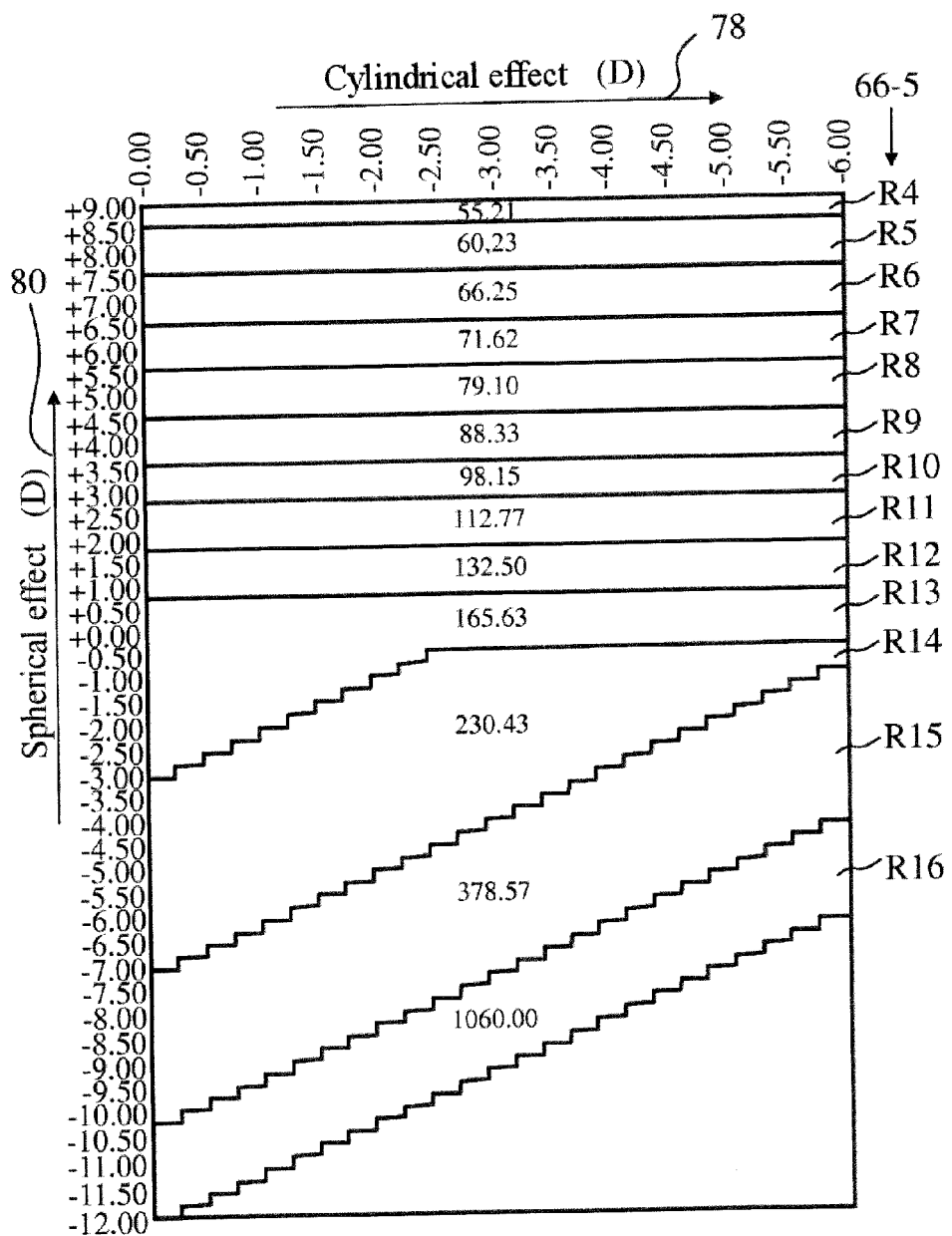
FIG. 8 shows a further schematic illustration of an assignment of spectacle lens semifinished product types, which each have a standardized physical form feature in the form of a radius of curvature of the front surface of the spectacle lens semifinished products consisting of a base material of the respective spectacle lens semifinished product types with an average refractive index of 1.67, to predetermined regions of optical corrections which are generable on the basis of the spectacle lens semifinished product types.

FIG. 7 and FIG. 8 elucidate the assignment of spectacle lens semifinished product types which are characterized by specific radii of curvature to optical corrections which are generable (in a functionally and/or economically advantageous manner) on the basis of the corresponding spectacle lens semifinished product type.

In FIGS. 7 and 8, the axis 80 denotes the spherical refractive power of the spectacle lens to be generated in diopter D. Furthermore, the axis 78 denotes the astigmatic effect in diopter D (negative cylinder convention). A further parameter underlying FIGS. 7 and 8 is the possible addition for varifocal lenses. The diagrams according to FIGS. 7 and 8 apply for additions in the range between 2.25 and 2.5 D.

Each one of FIGS. 7 and 8 describes a series 66-4, 66-5 of the semifinished product types which are characterized by the radii of curvature R4, R5, R6, . . . R16 of the front surfaces of the semifinished products. The series 66-4, 66-5 in accordance with FIGS. 7 and 8 differ from one another in respect of their average refractive index $n_d$ of their base material. A material with a refractive index of $n_d$=1.6 underlies the illustration in FIG. 7. A material with a refractive index of $n_d$=1.67 underlies the illustration in FIG. 8.

Each spectacle lens semifinished product type, that is, semifinished products which have a specific radius of curvature Ri with i=1 ... 20, may be assigned to a specific range of the spherical refractive power and a specific range of the astigmatic correction, which are generable on the basis thereof. In view of the refractive indices $n_d$, deviating from one another, of the base materials according to the illustrations shown in FIGS. 7 and 8 on the basis of spectacle lens semifinished product types with the same radii of curvature, it is understood that it is not possible to cover identical ranges in the case of different materials.

According to the illustration in FIG. 7, the series 66-4 comprises twelve different spectacle lens semifinished product types with twelve different radii of curvature R5 to R16. From the illustration in FIG. 8, it is possible to gather that the series 66-5 comprises thirteen different spectacle lens semifinished product types with thirteen different radii of curvature R4 to R16. In FIG. 7 and FIG. 8, the radii of curvature R4 to R16 are specified in millimeters in each case.

The radii of curvature of the spectacle lens semifinished product types in FIGS. 7 and 8 are assigned to the same global definition of radii of curvature 62. As a matter of principle, spectacle lenses with stronger optical corrections may be generated on the basis of the material with the higher refractive index (cf. FIG. 8), for example in order to cover a larger range for the spherical refractive power.

Figure 9:
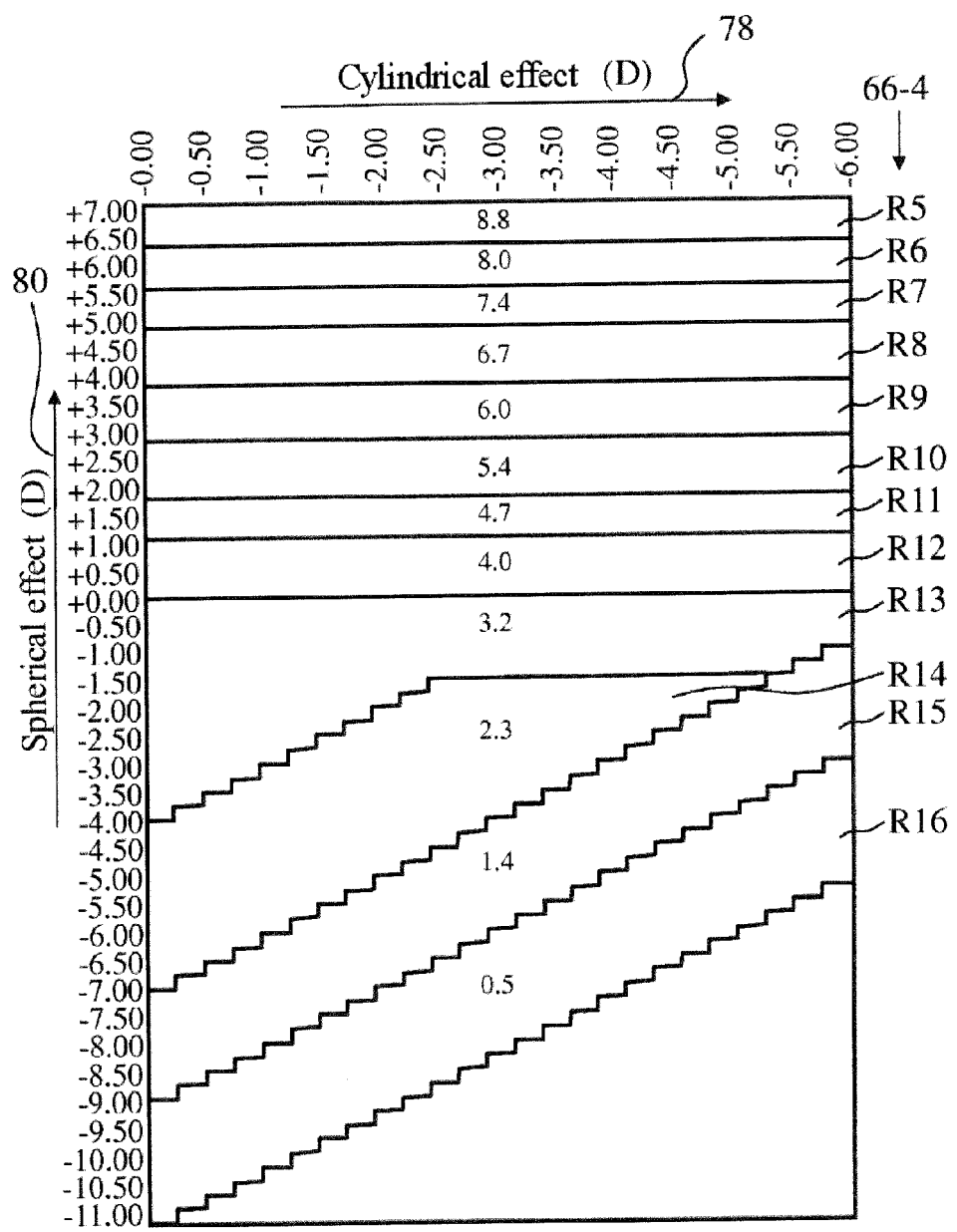
FIG. 9 shows the illustration of the assignment according to FIG. 7, wherein the radii of curvature are converted to an actual surface power value in relation to a standard refractive index of 1.53.
Figure 10:
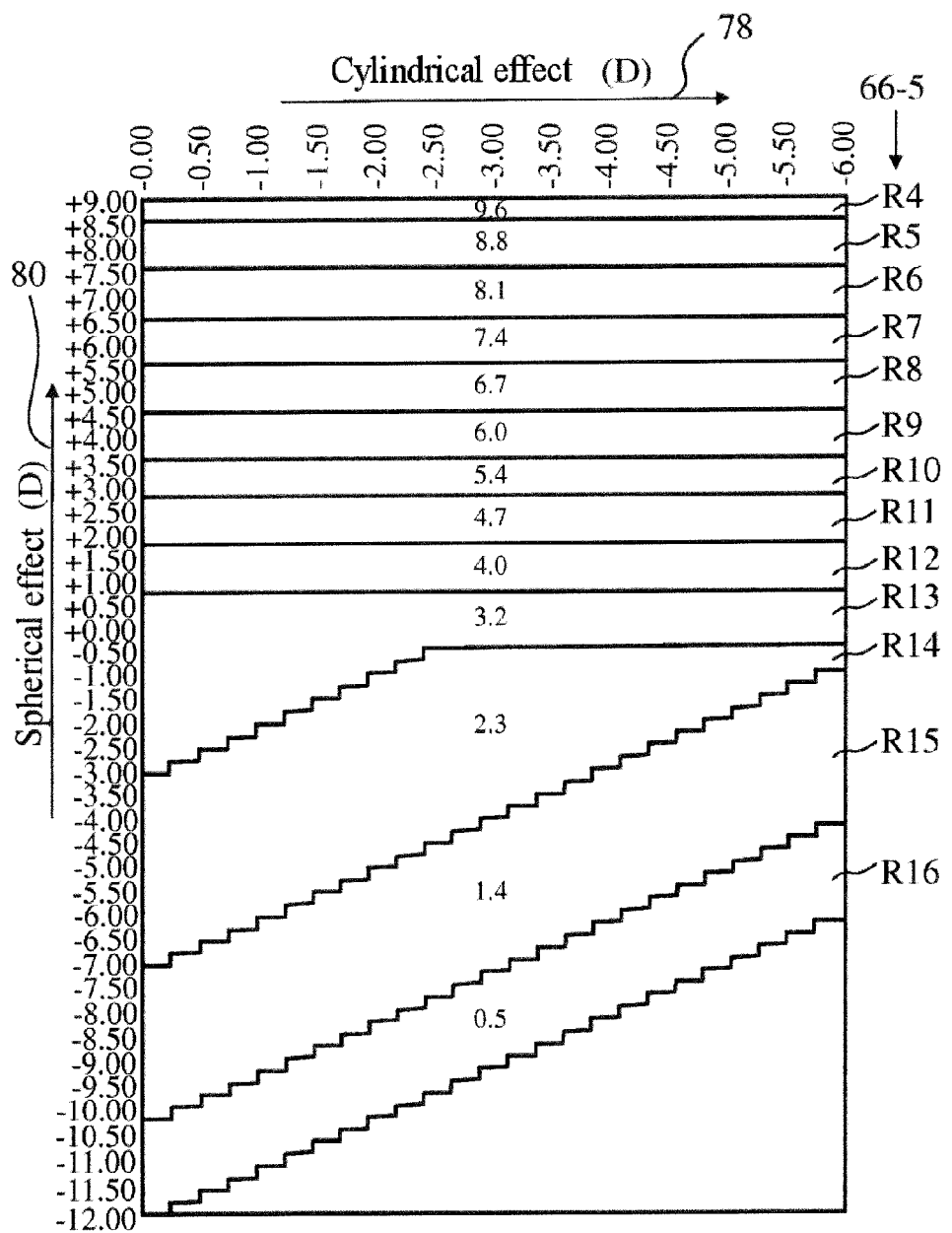
FIG. 10 shows the illustration of the assignment according to FIG. 8, wherein the radii of curvature are converted to an actual surface power value in relation to a standard refractive index of 1.53.

In terms of content, the graphs according to FIGS. 9 and 10 correspond completely to the illustrations according to FIGS. 7 and 8. In particular, FIG. 9 shows the assignment of spectacle lens semifinished product types which are characterized by specific radii of curvature to optical corrections which are generable (in a functionally and/or economically advantageous manner) for the series 66-4 of semifinished product types on the basis of the corresponding spectacle lens semifinished product types, the semifinished product types being characterized by the radii of curvature R5, R6, . . . R16 of the front surfaces of the semifinished products and based on semifinished products made of the base material with a refractive index of $n_d$=1.6. In particular, FIG. 10 shows the assignment of spectacle lens semifinished product types which are characterized by specific radii of curvature to optical corrections which are generable (in a functionally and/or economically advantageous manner) for the series 66-5 of semifinished product types on the basis of the corresponding spectacle lens semifinished product type, the semifinished product types being characterized by the radii of curvature R4, R5, R6, . . . R16 of the front surfaces of the semifinished products and based on semifinished products made of the base material with a refractive index of $n_d$=1.67.

Instead of the values of the radii of curvature R4, R5, R6, . . . R16 in millimeters, FIGS. 9 and 10 show the corresponding actual surface power value $D_n$ in relation to a standard refractive index $n_s$ of 1.53, the actual surface power value being obtainable by a conversion according to the equation $$D_n = (1 - n_s)/R \quad (2)$$

from the radius R specified above. The following simple configuration rules for the set of semifinished products comprising the spectacle lens semifinished product series 66-4 and 66-5 are gathered from FIGS. 9 and 10.

The first series 66-4 and the second series 66-5 each have types of spectacle lens semifinished products, the front surfaces of which have an actual surface power with identical actual surface power values in relation to a standard refractive index of 1.53, namely with the values $D_n$=0.5; 1.4; 2.3; 3.2; 4.0; 4.7; 5.4; 6.0; 6.7; 7.4; 8.0 and 8.8.

The equalization of the actual surface power values of the front surfaces of the different types of the first series 66-4 in relation to the standard refractive index of 1.53 and the actual surface power values of the front surfaces of the different types of the second series 66-5 in relation to the standard refractive index of 1.53 is carried out in such a way that the difference between one of the identical actual surface power values in relation to the standard refractive index of 1.53 and the next larger identical actual surface power value in relation to the standard refractive index of 1.53, namely the actual surface power values between the type denoted by R16 and the type denoted by R15 or between the type denoted by R15 and the type denoted by R14, et cetera, is less than a predetermined threshold. The difference values all lie in the range between 0.6 D and 0.8 D, and are therefore all less than 0.85 D.

The equalization of the actual surface power values of the front surfaces of the different types of the first series 66-4 in relation to the standard refractive index of 1.53 and the actual surface power values of the front surfaces of the different types of the second series 66-5 in relation to the standard refractive index of 1.53 is carried out in such a way that the difference between one of the identical actual surface power values in relation to the standard refractive index of 1.53 and the next larger identical actual surface power value in relation to the standard refractive index of 1.53, namely the actual surface power values between the type denoted by R16 and the type denoted by R15 or between the type denoted by R15 and the type denoted by R14, et cetera, is identical to a fixedly predetermined difference value within a variance range of 15%. In the embodiment, the predetermined difference value is 0.7 D and the variance is 0.1 D.

Even though FIGS. 7 to 10 show two series 66-4, 66-5 with semifinished products made of different base materials in merely an exemplary manner, it is clear to a person skilled in the art what, in principle, corresponding diagrams look like for the embodiment of the set 68 with the three series 66-1, 66-2, 66-3 of semifinished products underlying FIG. 6. If this set 68 is based upon the same values for the radii R4 to R13 as can be gathered from FIGS. 7 and 8, it is possible to see in FIG. 6 that the series 66-1, 66-2, 66-3 of semifinished products have three pairwise different types No. 7, 10 and 13 corresponding to the radii R7, R10 and R13, which are common to all series 66-1, 66-2, 66-3 or identical in all three series 66-1, 66-2, 66-3, within the actual surface value range of the front surface thereof of between 3.2 D and 6.7 D in relation to a standard refractive index of 1.53.

If the assumption is made that the first series 66-1 only comprises semifinished products made of a base material with an average refractive index $n_{d1}$ of 1.5, the second series 66-2 only comprises semifinished products made of a base material with an average refractive index $n_{d2}$ of 1.6 and the third series 66-3 only comprises semifinished products made of a base material with an average refractive index $n_{d3}$ of 1.74, the condition that the average refractive indices $n_{d1}$, $n_{d2}$, $n_{d3}$ of the three series 66-1, 66-2, 66-3 differ by at least 0.06 is also satisfied.

The difference between in each case one of the identical surface power values and the next larger identical surface power value in each case is 1.5 D (No. 13 to No. 11) and 1.3

D (No. 11 to No. 9). Hence, a mean value of 1.4 D and a variance of 0.1 D emerges. Accordingly, the variance is less than 7.5%.

It is furthermore possible to gather from FIG. 6 that, in the series 66-1, 66-2, 66-3 of semifinished products and within the actual surface power value range of the front surface thereof of between 0.5 D (corresponding to No. 5) and 9.6 D (corresponding to No. 3) in relation to a standard refractive index of 1.53, the types No. 5 and No. 3 corresponding to the radii R3 and R5 are also present in an identical manner in all three series 66-1, 66-2, 66-3 of semifinished products in addition to the different types No. 7, 10 and 13 present in all three series corresponding to the radii R7, R10 and R13.

Figure 11:
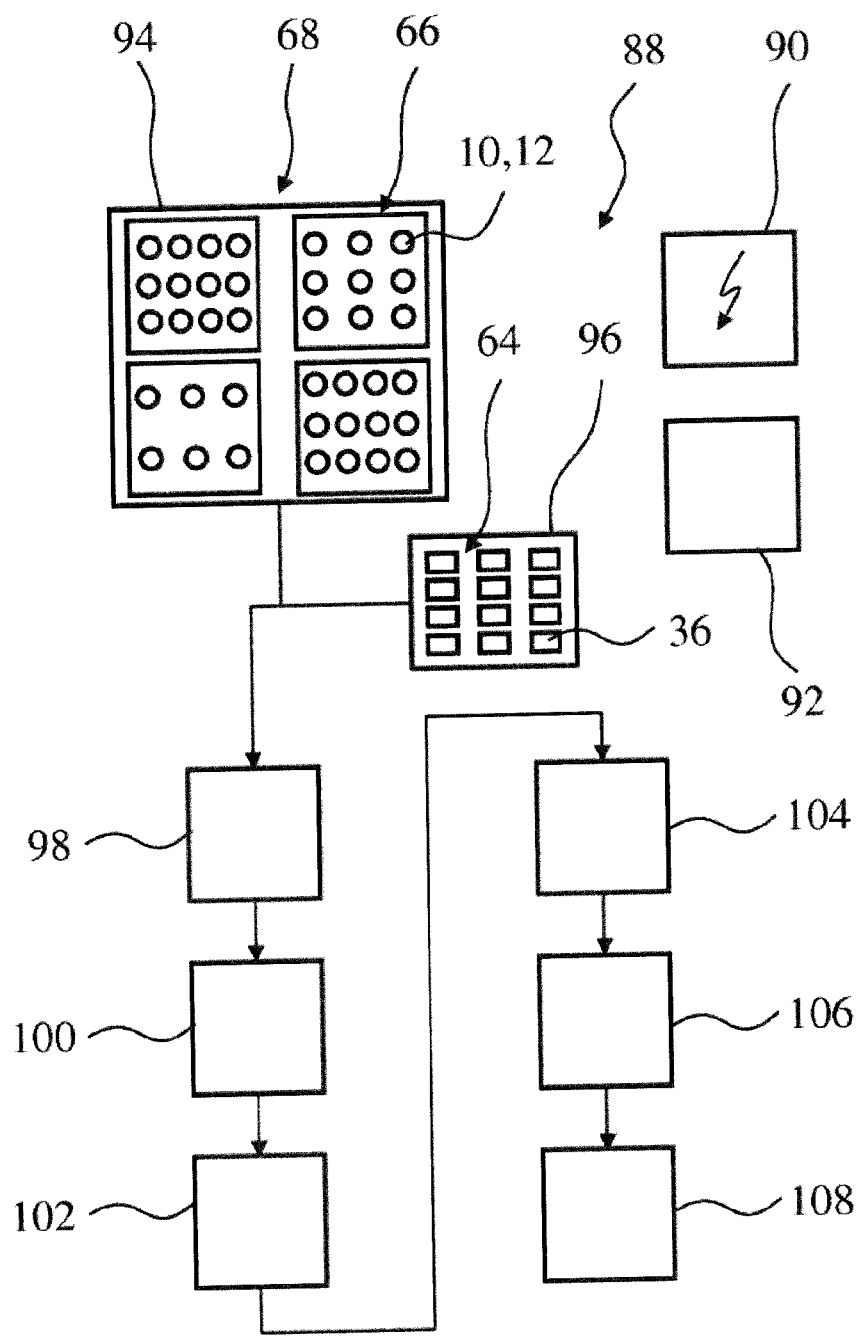
FIG. 11 shows a much simplified schematic block diagram of an installation or system for producing spectacle lenses.

FIG. 11 elucidates, in a much simplified schematic manner on the basis of a block diagram, a manufacturing system 88 for manufacturing spectacle lenses from organic materials. In the present embodiment, the manufacturing system 88 comprises a control device 90, which, for example, can also be referred to as master computer or process computer. The control device is able to communicate with various components or devices of the system 88. The manufacturing system 88 furthermore comprises a handling device 92 providing means for handling semifinished products 10, 12, on the basis of which the spectacle lenses are produced. In particular, the handling device 92 can be configured to grip, displace and/or implement a receiving device 34 (cf. FIG. 2) for the spectacle lens semifinished products 10, 12. The handling device 92 may be coupled to further components of the manufacturing system 88 in order to feed these to the receiving device 34 with the spectacle lens semifinished products 10, 12 received therein or in order to move the receiving device 34 with the spectacle lens semifinished product 10, 12 received therein away from the further components.

In the present embodiment, the manufacturing system 88 comprises a store 94, in which a set 68 of series 66 of spectacle lens semifinished products 10, 12 of the type according to the invention, as described above, is provided. Alternatively, the manufacturing system 88 can also be coupled to the store 94 and/or one or more further stores (not shown in the figure). To the extent that all series 66 in the store 94 correspond to the global convention or setting of the contact surfaces, in particular of the radii of curvature, it is ensured that each spectacle lens semifinished product 10 from the store 94 can be blocked and machined.

The manufacturing system 88 is furthermore coupleable to a store 96 for receiving devices 34 or for contact sections 38 for receiving devices 34, wherein the receiving devices 34 are assigned to a set 64 of receiving devices 34 of the type described above. It is preferable for all contact sections 38 or receiving devices 34 in the store 96 to be configured in accordance with the global definition or convention. In this manner, there is a fitting contact section 38 available for each spectacle lens semifinished product type of the series 66-1, 66-2, 66-3.

After the receipt of the manufacturing order, it is possible, for example by means of the handling device 92, to select spectacle lens semifinished products 10, 12 from the series 66-1, 66-2, 66-3 of the set 68 and supply the latter to a blocking station 98. Furthermore, it is possible to take a receiving device 34 with a contact section 38, which, for example, is fitted to a radius of curvature of the front surface of the selected spectacle lens semifinished product 10, 12, from the store 96 and supply the contact section to the blocking station 98.

In the blocking station 98, the selected blank 10, 12 can be blocked on the receiving device 34. In particular, blocking may comprise blocking by means of negative pressure or vacuum blocking. In this way, it is possible to generate a composite consisting of the receiving device 34 and the spectacle lens semifinished product 10, 12. The composite can be transferred to the machining station 100, which is, for example, configured as a grinding station, milling station, turning station, or in a similar manner. The back surface of the blocked spectacle lens semifinished product 10, 12 can be machined in the machining station 100. Thanks to the receiving device 38, it is possible to receive the spectacle lens semifinished product 10, 12 very accurately in the machining station 100 and, accordingly, it is possible to machine the spectacle lens semifinished product very precisely.

In an exemplary manner, this is followed by transfer to a polishing station 102. The polishing station 102 is provided and configured to polish the machined back surface of the spectacle lens semifinished product 10, 12.

This can be followed by further transfer to a blocking removal station 104, in which the blocked spectacle lens semifinished product 10, 12 is removed or the block is lifted from the receiving device 34. By way of example, this may be carried out by pressure equalization in the case of vacuum blocking. After lifting the blocking, the spectacle lens semifinished product 10, 12 (which has been machined further in the meantime) can be detached from the receiving device 34 and can be continued to be handled and machined independently thereof.

Accordingly, the spectacle lens semifinished product 10, 12 can be transferred to, for example, a surface machining station 106. By way of example, the surface machining station 106 can be configured as a coating station or in a similar manner. By way of example, a hard coating can be applied to the front surface and/or the back surface of the blank 10, 12 in the surface machining station 106. The desired spectacle lens can be completed in this manner.

This can be followed by a final control station 108, to which the spectacle lens is transferred. The final control station 108 is provided and configured to carry out a final control of the spectacle lens, in particular in respect of the optical and/or mechanical properties thereof.

The handling of the spectacle lens semifinished product 10, 12 or of the receiving device 34, in which the spectacle lens semifinished product can be received, can be carried out by the handling device 92. It is furthermore understood that appropriate control stations or testing stations may be disposed upstream or between at least some of the stations 89, 100, 102, 104, 106. In particular, the manufacturing system 88 is configured to be able to handle and machine a large number of variants of the spectacle lens semifinished products 10, 12 by means of a manageable number of receiving devices 34 or of contact sections 38 for the receiving devices 34.

Figure 12:
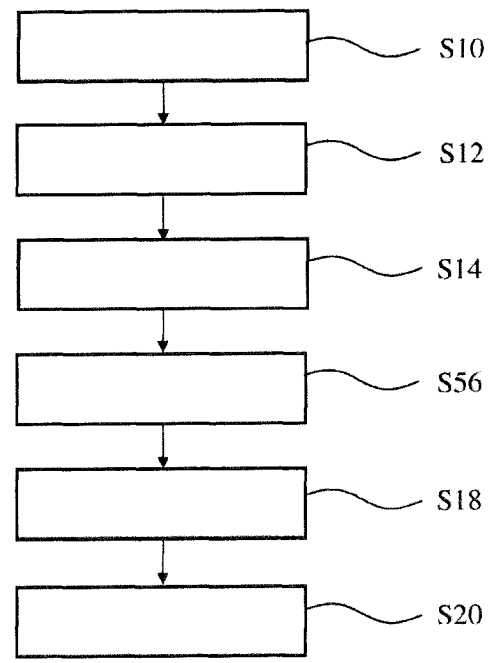
FIG. 12 shows a much simplified schematic block diagram of a configuration of a method for producing spectacle lenses.

On the basis of a block diagram, FIG. 12 elucidates, in a much simplified manner, a configuration of a method for producing spectacle lenses, which makes use of various aspects of the present disclosure. The method shown in FIG. 12 comprises a step S10, the provision of a set of semifinished products. The set has a restricted number of spectacle lens semifinished product types, wherein each spectacle lens semifinished product type has a defined contact surface with at least one standardized physical form feature. By way of example, the at least one physical form feature can be a contact surface configuration of the front surface of the spectacle lens semifinished product, in particular the entire front surface configuration. Preferably, the physical form feature is a front surface curvature or, in general, a contact surface curvature.

A further step S12 comprises setting at least one desired optical property of a spectacle lens to be produced. By way of example, the step S12 can be carried out on the basis of data which describe the defective vision of a patient or customer. By way of example, this includes the prescription which was created by an optician, an ophthalmologist or another person educated preferably in a corresponding manner. Where necessary, data which are able to describe the probable usage conditions may likewise be taken into account.

In the present embodiment, this is followed by a step S14, which comprises the selection of a spectacle lens semifinished product from the provided set of spectacle lens semifinished products. In particular, this can be carried out taking into account a step S12, in which the desired optical property is set. The selection of the spectacle lens semifinished product type corresponding to the spectacle lens semifinished product to be selected should be carried out under the stipulation that the desired optical property is in fact generable on the basis of the spectacle lens semifinished product type.

In the present embodiment, this is followed by a step S16, which comprises the selection of a receiving device or the selection of a contact section for a receiving device, which is embodied to be able to securely and tightly hold the selected spectacle lens semifinished product. In this way, it is possible to significantly simplify the so-called blocking of the spectacle lens semifinished product on the receiving device. In particular, step S16 may comprise the selection of a contact section which is adapted in geometric terms to the standardized physical form feature of the spectacle lens semifinished product type. By way of example, the contact section may comprise a receiving seat which has a radius of curvature which substantially corresponds to the radius of curvature of the contact surface or of the front surface of the spectacle lens semifinished product.

In the example, this is followed by a further step S18, which comprises blocking of the spectacle lens semifinished product onto the receiving device or onto the contact section thereof. In particular, step S18 may comprise vacuum blocking. In this way, the spectacle lens semifinished product may be held with force fit on the receiving device without requiring a cohesive connection.

This is followed by a further step S20, which comprises machining of the blocked spectacle lens semifinished product. The spectacle lens semifinished product blocked on the receiving device can be received precisely and securely for machining such that highly accurate machining is rendered possible. The machining of the back surface of the spectacle lens semifinished product can be carried out in particular, for example, in the manner described above, changing the back surface in terms of the form thereof. Further machining steps, such as, for example, the application of one or more functional layers, as presented in the introductory part of the description can be carried out.

Figure 13:
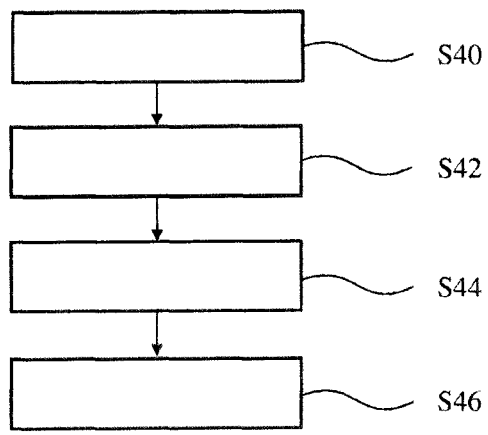
FIG. 13 shows a much simplified schematic block diagram of an alternative configuration of a method for producing spectacle lenses, which is based on the method elucidated on the basis of FIG. 10; and, FIG. 14 shows a much simplified, schematic block diagram for elucidating possible partial steps of a method step of the method for producing spectacle lenses, elucidated on the basis of FIG. 10.

On the basis of a much simplified schematic block diagram, FIG. 13 shows an alternative configuration of a method for producing spectacle lenses. The method elucidated on the basis of FIG. 13 may have a similar configuration to the method elucidated on the basis of FIG. 12, at least in terms of substantial aspects thereof. The method according to FIG. 13 comprises a step S40, which comprises the provision of a set of series of spectacle lens semifinished products. Each one of the series in the set comprises spectacle lens semifinished products which are produced from the same material. A plurality of spectacle lens semifinished product types are provided in each one of the series in the set, with each part of each series in the set belonging to a global definition of standardized physical form features.

This is followed by step S42, which comprises the setting of at least one optical property. A preliminary selection in respect of a suitable series can be made on the basis of step S42. This is carried out in a step S44. This is followed by a step S46, which comprises the selection of a spectacle lens semifinished product from the series which was selected in step S44. The spectacle lens semifinished product can be selected, in particular, taking into account the desired optical property or the desired optical correction.

Step S44, which relates to the preselection of a series, may, in addition to selecting a material or base material with the desired refractive index, comprise the selection of a specific coating and/or the selection of a specific color, which were already produced in the semifinished product.

Steps S40 to S46 may be followed by further handling steps and machining steps which, in principle, may correspond to the steps S16, S18 and S20, which were shown in FIG. 12 and described above.

Figure 14:
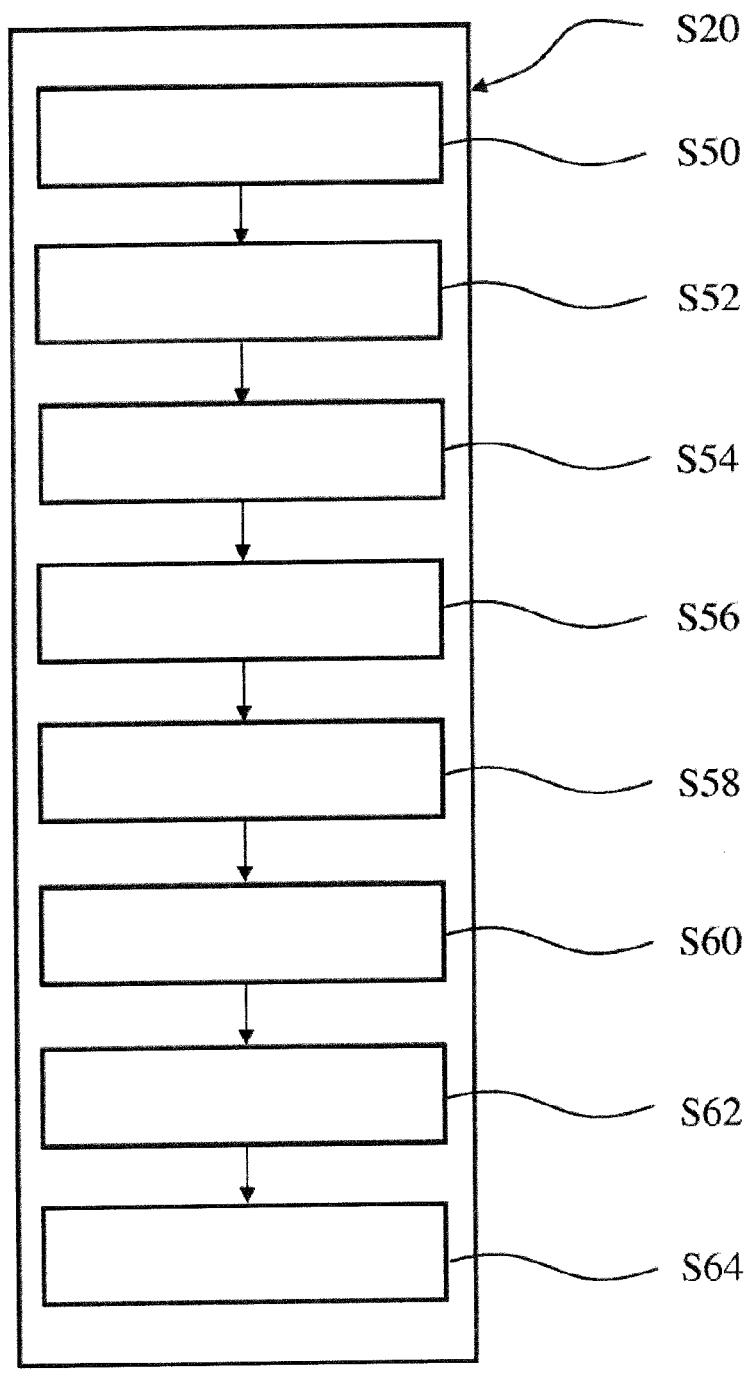

On the basis of a block diagram, FIG. 14 shows a configuration of a machining step which approximately corresponds to step S20 in accordance with FIG. 12. It is assumed that step S20 is preceded by blocking a spectacle lens semifinished product with its spherical or rotationally symmetric aspherical front side onto a receiving device.

The machining step S20 has a partial step S50, in which the back surface of the spectacle lens semifinished product obtains a desired varifocal geometry by milling. Naturally, other optical corrections on the back surface of the spectacle lens semifinished product by way of the partial step S50 are also possible.

The partial step S50 is followed by a partial step S52, which includes checking of the spectacle lens semifinished product milled into form. In particular, partial step S52 may comprise a checking of the contour of the produced surface geometry, a checking of the roughness of the produced surface geometry and/or a checking of the alignment of the produced back surface in relation to the front surface.

There is polishing of the back surface of the milled blank in the partial step S54. The spectacle lens obtains its desired optical transparency as a result of the polishing process.

The partial step S54 is followed by a partial step S56 which comprises a quality control or checking of the polishing result.

A further subsequent partial step S58 comprises the removal of the blocking of the spectacle lens semifinished product. The spectacle lens semifinished product is separated from the receiving device. If a vacuum blocker is used, the partial step S58 comprises a pressure equalization in a cavity between the vacuum blocker and the received spectacle lens semifinished product.

In the subsequent partial step S60, there is checking or a quality control of the (almost complete) blank which is no longer blocked.

There is a surface treatment or a surface coating of the blank in a further following partial step S62. By way of example, a hard coating, an antireflection coating and a coating with antistatic effect may be applied. In particular, it is possible for not only the back surface but also the front surface of the blank to be coated.

In the present embodiment, the machining step S20 comprises a final partial step S64, which includes (renewed) checking of the machining result, in particular the result of the surface treatment.

It is understood that at least some of the (partial) steps, in particular partial steps S52, S56, S60 and S64, may be bypassed. However, it is often the case that there is appropriate quality control in each partial step during the production of spectacle lenses in order to ensure the best possible quality.

In summary, in the set (68) of spectacle lens semifinished products (10, 12), each lens has a front surface (16) with a spherical or rotationally symmetric aspherical, convex form, which has at least one physical form feature (R1, R2, R20) with an associated form dimension. The set includes:

a first series (66-1) of spectacle lens semifinished products (10, 12) made of a base material with a first average refractive index $n_{d1}$, wherein the first series (66-1) has pairwise different types (No. 1, No. 2, No. 20) of spectacle lens semifinished products (10, 20) which differ in the form dimension of the at least one physical form feature (R1, R2, . . . R20) of the form of the front surface (16) thereof, wherein at least three different types (No. 7, No. 10, No. 13) of the pairwise different types (No. 1, No. 2, . . . No. 20) have an actual surface power value ($D_n$) of the front surface (16) thereof of between 3.2 D and 6.7 D in relation to a standard refractive index ($n_s$) of 1.53 and determined, in the case of a rotationally symmetric aspherical form of the front surface, at the center of symmetry (15) thereof;

a second series (66-2) of spectacle lens semifinished products (10, 12) made of a base material with a second average refractive index ($n_{d2}$) that differs from the first average refractive index ($n_{d1}$), wherein the second series (66-2) has pairwise different types (No. 1, No. 3, No. 5, No. 7, No. 9, No. 10, No. 11, No. 13, No. 14, No. 16, No. 18, No. 20) of spectacle lens semifinished products (10, 12) which differ in the form dimension of the at least one physical form feature (R1, R2, . . . R20) of the form of the front surface (16) thereof;

a third series (66-3) of spectacle lens semifinished products (10, 12) made of a base material with a third average refractive index ($n_{d3}$) that differs from the first average refractive index ($n_{d1}$) and the second average refractive index ($n_{d2}$), wherein the third series (66-3) has pairwise different types (No. 3, No. 7, No. 10, No. 13, No. 16) of spectacle lens semifinished products (10, 12) which differ in the form dimension of the at least one physical form feature (R1, R2, . . . R20) of the form of the front surface (16) thereof;

at least three different types (No. 7, No. 10, No. 13) of the pairwise different types of the second series (66-2) have an actual surface power value ($D_n$) of the front surface (16) thereof of between 3.2 D and 6.7 D in relation to a standard refractive index ($n_s$) of 1.53;

at least three different types (No. 7, No. 10, No. 13) of the pairwise different types (No. 3, No. 7, No. 10, No. 13, No. 16) of the third series (66-3) have an actual surface power value ($D_n$) of the front surface (16) thereof of between 3.2 D and 6.7 D in relation to a standard refractive index ($n_s$) of 1.53;

the form dimensions of the at least one physical form feature (R7, R10, R13) of the form of the front surfaces (16) of the at least three different types (No. 7, No. 10, No. 13) of the first series (66-1) and the form dimensions of the at least one physical form feature (R7, R10, R13) of the form of the front surfaces (16) of the at least three different types (No. 7, No. 10, No. 13) of the second series (66-2) and the form dimensions of the at least one physical form feature (R7, R10, R13) of the form of the front surfaces (16) of the at least three different types (No. 7, No. 10, No. 13) of the third series (66-3) are identical, wherein the at least one form feature (R, R1, R2, . . . R20, $D_n$) is/are:

a) the actual curvature and/or b) the actual radius of curvature and/or c) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, . . . are the coefficients of the correction polynomial.

It is understood that the foregoing description is that of the preferred embodiments of the invention and that various changes and modifications may be made thereto without departing from the spirit and scope of the invention as defined in the appended claims.

What is claimed is:

1. A set of spectacle lens semifinished products, which each have a front surface with a spherical or rotationally symmetric aspherical, convex form, which has at least one physical form feature with an associated form dimension, the set comprising:

a first series of spectacle lens semifinished products made of a base material with a first average refractive index ($n_{d1}$), wherein the first series has pairwise different types of spectacle lens semifinished products which differ in the form dimension of said at least one physical form feature of the form of the front surface thereof, wherein at least three different types of the pairwise different types have an actual surface refractive power value ($D_n$) of the front surface thereof of between 3.2 D and 6.7 D referred to a standard refractive index ($n_s$) of 1.53 and determined, in the case of a rotationally symmetric aspherical form of the front surface, at the center of symmetry thereof;

a second series of spectacle lens semifinished products made of a base material with a second average refractive index ($n_{d2}$) different from the first average refractive index ($n_{d1}$), wherein the second series has pairwise different types of spectacle lens semifinished products which differ in the form dimension of the at least one physical form feature of the form of the front surface thereof;

a third series of spectacle lens semifinished products made of a base material with a third average refractive index ($n_{d3}$) that differs from the first average refractive index ($n_{d1}$) and the second average refractive index ($n_{d2}$), wherein the third series has pairwise different types of spectacle lens semifinished products which differ in the form dimension of the at least one physical form feature of the form of the front surface thereof;

at least three different types of the pairwise different types of the second series having an actual surface power value ($D_n$) of the front surface thereof of between 3.2 D and 6.7 D referred to a standard refractive index ($n_s$) of 1.53;

at least three different types of the pairwise different types of the third series having an actual surface refractive power value ($D_n$) of the front surface thereof of between 3.2 D and 6.7 D in relation to a standard refractive index ($n_s$) of 1.53;

the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series being identical, wherein the at least one form feature is:

a) the actual curvature and/or
b) the actual radius of curvature and/or
c) the vertex curvature (ρ) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1-(1+k)(\rho r)^2}} + A_4 r^4 + A_6 r^6 + \ldots$$

where z is the sagittal height, r is the incident height, ρ is the vertex curvature and k is the conic constant of the conic section, and $A_4$, $A_6$, ... are the coefficients of the correction polynomial.

2. The set of spectacle lens semifinished products of claim 1, wherein the first average refractive index ($n_{d1}$) and the second average refractive index ($n_{d2}$) and the third average refractive index ($n_{d3}$) differ pairwise by at least 0.04, preferably by at least 0.05, more preferably by at least 0.06.

3. The set of spectacle lens semifinished products of claim 1, wherein:

at least four, preferably at least five, different types of the pairwise different types of the first series, which differ in terms of the form dimension of the at least one physical form feature of the form of the front surface thereof, have an actual surface power value ($D_n$) of the front surface thereof of between 3.2 D and 6.7 D referred to a standard refractive index ($n_s$) of 1.53;

at least four, preferably at least five, different types of the pairwise different types of the second series, which differ in terms of the form dimension of the at least one physical form feature of the form of the front surface thereof, have an actual surface power value of the front surface thereof of between 3.2 D and 6.7 D in relation to a standard refractive index ($n_s$) of 1.53;

at least four, preferably at least five, different types of the pairwise different types of the third series, which differ in terms of the form dimension of the at least one physical form feature of the form of the front surface thereof, have an actual surface power value of the front surface thereof of between 3.2 D and 6.7 D in relation to a standard refractive index ($n_s$) of 1.53; and, the form dimensions of the at least one physical form feature of the form of the front surfaces of the at least four, preferably at least five, different types of the first series and the form dimensions of the at least one physical form feature of the form of the front surfaces of the at least four, preferably at least five, different types of the second series and the form dimensions of the at least one physical form feature of the form of the front surfaces of the at least four, preferably at least five, different types of the third series are identical.

4. The set of spectacle lens semifinished products of claim 1, wherein:

the first series and the second series and the third series each have types of spectacle lens semifinished products, the front surfaces of which have a form feature with identical form dimensions, and in that the difference between in each case one of the identical form dimensions or the inverse thereof and the in each case next-larger identical form dimension or the inverse thereof is of equal size within a variance of 20%, preferably of 10%, most preferably of 5%.

5. The set of spectacle lens semifinished products of claim 1, wherein:

the at least one form feature is an actual surface refractive power ($D_n$) and the associated form dimension is the associated actual surface power value in relation to a standard refractive index ($n_s$) of 1.53 such that the first series and the second series and the third series each have types of spectacle lens semifinished products, the front surfaces of which have an actual surface refractive power ($D_n$) with identical actual surface power values in relation to a standard refractive index ($n_s$) of 1.53, and the difference between one of the identical actual surface power values in relation to the standard refractive index ($n_s$) of 1.53 and the next-larger identical actual surface power value in relation to the standard refractive index ($n_s$) of 1.53 is less than 2.5 D, preferably less than 2.3 D, more preferably less than 1.5 D, even more preferably less than 1.0 D and most preferably less than 0.8 D.

6. The set of spectacle lens semifinished products of claim 1, wherein:

at least ten, preferably at least eleven, more preferably at least twelve, most preferably at least thirteen, different types of the pairwise different types of the first series, which differ in terms of the form dimension of the at least one physical form feature of the form of the front surface thereof, have an actual surface power value of the front surface thereof of between 0.5 D and 9.60 D in relation to a standard refractive index ($n_s$) of 1.53;

at least ten, preferably at least eleven, more preferably at least twelve, most preferably at least thirteen, different types of the pairwise different types of the second series, which differ in terms of the form dimension of the at least one physical form feature of the form of the front surface thereof, have an actual surface power value of the front surface thereof of between 0.5 D and 9.60 D in relation to a standard refractive index ($n_s$) of 1.53;

at least ten, preferably at least eleven, more preferably at least twelve, most preferably at least thirteen, different types of the pairwise different types of the third series, which differ in terms of the form dimension of the at least one physical form feature of the form of the front surface thereof, have an actual surface power value of the front surface thereof of between 0.50 D and 9.60 D in relation to a standard refractive index ($n_s$) of 1.53; and, the form dimensions of the at least one physical form feature of the form of the front surfaces of the at least ten, preferably at least eleven, more preferably at least twelve, most preferably at least thirteen, different types of the first series and the form dimensions of the at least one physical form feature of the form of the front surfaces of the at least ten, preferably at least eleven, more preferably at least twelve, most preferably at least thirteen, different types of the second series and the form dimensions of the at least one physical form feature of the form of the front surfaces of the at least ten, preferably at least eleven, more preferably at least twelve, most preferably at least thirteen, different types of the third series are identical.

7. A method for making spectacle lenses, comprising the steps of:
   a) providing a set of spectacle lens semifinished products, which each have a back surface and a front surface with a spherical or rotationally symmetric aspherical, convex form, which has at least one physical form feature with an associated form dimension, including:
      a first series of spectacle lens semifinished products made of a base material with a first average refractive index ($n_{d1}$), wherein the first series has pairwise different types of spectacle lens semifinished products which differ in the form dimension of the at least one physical form feature of the form of the front surface thereof, wherein at least three different types of the pairwise different types have an actual surface power value ($D_n$) of the front surface thereof of between 3.2 D and 6.7 D in relation to a standard refractive index ($n_s$) of 1.53 and determined, in the case of a rotationally symmetric aspherical form of the front surface, at the center of symmetry thereof;
      a second series of spectacle lens semifinished products made of a base material with a second average refractive index ($n_{d2}$) that differs from the first average refractive index ($n_{d1}$), wherein the second series has pairwise different types of spectacle lens semifinished products which differ in the form dimension of the at least one physical form feature of the form of the front surface thereof; and,
      a third series of spectacle lens semifinished products made of a base material with a third average refractive index ($n_{d3}$) that differs from the first average refractive index ($n_{d1}$) and the second average refractive index ($n_{d2}$), wherein the third series has pairwise different types of spectacle lens semifinished products which differ in the form dimension of the at least one physical form feature of the form of the front surface thereof;
   b) receiving one of the spectacle lens semifinished products from the provided set of spectacle lens semifinished products;
   c) machining the back surface of the received spectacle lens semifinished product;
   at least three different types of the pairwise different types of the second series having an actual surface power value of the front surface thereof of between 3.2 D and 6.7 D in relation to a standard refractive index ($n_s$) of 1.53;
   at least three different types of the pairwise different types of the third series having an actual surface power value of the front surface thereof of between 3.2 D and 6.7 D in relation to a standard refractive index ($n_s$) of 1.53; and,
   the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series being identical, wherein the at least one form feature is:
   a) the actual curvature and/or
   b) the actual radius of curvature and/or
   c) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1-(1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, ... are the coefficients of the correction polynomial.

8. The method for making spectacle lenses of claim 7, wherein the provided set of semifinished products is embodied as claimed in claim 2.

9. The method for making spectacle lenses of claim 7, wherein, in step b), the receiving of the spectacle lens semifinished product from the provided set of spectacle lens semifinished products is carried out by means of a receiving device which has an embodiment complementary in terms of form to at least a portion of the form of the front surface.

10. The method for making spectacle lenses of claim 9, wherein the portion comprises at least 40%, preferably at least 50%, more preferably at least 60%, most preferably at least 70%, of the front surface of the received spectacle lens semifinished product.

11. The use of a set of spectacle lens semifinished products, wherein the spectacle lens semifinished products each have a front surface with a spherical or rotationally symmetric aspherical, convex form, which has at least one physical form feature with an associated form dimension, comprising:
   a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value ($D_n$) of the front surface thereof of between 3.2 D and 6.7 D in relation to a standard refractive index of 1.53 and determined, in the case of a rotationally symmetric aspherical form of the front surface, at the center of symmetry thereof;
   a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof;
   a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof;

at least three different types of the pairwise different types of the second series having an actual surface power value ($D_n$) of the front surface thereof of between 3.2 D and 6.7 D in relation to a standard refractive index ($n_s$) of 1.53;

at least three different types of the pairwise different types of the third series having an actual surface power value ($D_n$) of the front surface thereof of between 3.2 D and 6.7 D in relation to a standard refractive index ($n_s$) of 1.53; and, the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series being identical, wherein the at least one form feature is:

a) the actual curvature and/or
b) the actual radius of curvature and/or
c) the vertex curvature ($\rho$) of the conic section of the correction polynomial of the aspherical surface section defined in DIN ISO 10110, consisting of the sum of a conic section and a correction polynomial, in accordance with the equation:

$$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, . . . are the coefficients of the correction polynomial.

12. An apparatus for making spectacle lenses, the apparatus comprising:
a) a provision device for providing a set of spectacle lens semifinished products, wherein the spectacle lens semifinished products each have a back surface and a front surface with a spherical or rotationally symmetric aspherical, convex form, which has at least one physical form feature with an associated form dimension, the provision device including:
(i) a first series of spectacle lens semifinished products made of a base material with a first average refractive index, wherein the first series has pairwise different types of spectacle lens semifinished products which differ in the form dimension of the at least one physical form feature of the form of the front surface thereof, wherein at least three different types of the pairwise different types have an actual surface power value of the front surface thereof of between 3.2 D and 6.7 D in relation to a standard refractive index of 1.53 and determined, in the case of a rotationally symmetric aspherical form of the front surface, at the center of symmetry thereof;

(ii) a second series of spectacle lens semifinished products made of a base material with a second average refractive index that differs from the first average refractive index, wherein the second series has pairwise different types of spectacle lens semifinished products which differ in the form dimension of the at least one physical form feature of the form of the front surface thereof; and, (iii) a third series of spectacle lens semifinished products made of a base material with a third average refractive index that differs from the first average refractive index and the second average refractive index, wherein the third series has pairwise different types of spectacle lens semifinished products which differ in the form dimension of the at least one physical form feature of the form of the front surface thereof;

b) a receiving device for receiving one of the spectacle lens semifinished products from the provided set of spectacle lens semifinished products;

c) a machining device for machining the back surface of the received spectacle lens semifinished product;

at least three different types of the pairwise different types of the second series having an actual surface power value of the front surface thereof of between 3.2 D and 6.7 D in relation to a standard refractive index ($n_s$) of 1.53;

at least three different types of the pairwise different types of the third series having an actual surface power value of the front surface thereof of between 3.2 D and 6.7 D in relation to a standard refractive index ($n_s$) of 1.53;

the form dimensions of the at least one physical form feature of the form of the front surfaces of the at least three different types of the first series and the form dimensions of the at least one physical form feature of the form of the front surfaces of the at least three different types of the second series and the form dimensions of the at least one physical form feature of the form of the front surfaces of the at least three different types of the third series being identical;

wherein the at least one form feature is:
a) the actual curvature and/or
b) the actual radius of curvature and/or
c) the vertex curvature ($\rho$) of the conic section of the correction polynomial of the aspherical surface section defined in DIN ISO 10110, consisting of the sum of a conic section and a correction polynomial, in accordance with the equation:

$$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, . . . are the coefficients of the correction polynomial.

13. A computer-implemented method for configuring a set of spectacle lens semifinished products, wherein the spectacle lens semifinished products each have a front surface with a spherical or rotationally symmetric aspherical, convex form, which has at least one physical form feature with an associated form dimension, wherein the set of spectacle lens semifinished products comprises a first series of spectacle lens semifinished products made of a base material with a first average refractive index ($n_{d4}$) and a second series of spectacle lens semifinished products made of a base material with a second average refractive index ($n_{d5}$) which differs from the first average refractive index ($n_{d4}$) and a third series of spectacle lens semifinished products made of a base material with a third average refractive index with differs from the first average refractive index ($n_{d4}$) and from the second average refractive index ($n_{d5}$), wherein the first series has pairwise different types of spectacle lens semifinished products, which differ in terms of the form dimension of the at least one physical form feature of the form of the front surface thereof, and wherein the second series has pairwise different types of spectacle lens semifinished products, which differ in the form dimension of the at least one physical form feature of the form of the front surface thereof, and wherein the third series has pairwise different types of spectacle lens semifinished products, which differ in the form feature of the at least one physical form feature of the form of the front surface thereof; the method comprising the steps of:

a) equalizing or bringing into correspondence, the form dimensions of the at least one physical form feature of the form of the front surfaces of the different types of the first series and the form dimensions of the at least one physical form feature of the form of the front surfaces of the different types of the second series and the form dimensions of the at least one physical form feature of the form of the front surfaces of the different types of the third series such that the front surface forms of these different types are identical for all of the at least three series, either on a portion or on the whole front surface, wherein the at least one form feature is:

i) the actual curvature and/or ii) the actual radius of curvature and/or iii) the vertex curvature ($\rho$) of the conic section of the correction polynomial of the aspherical surface section defined in DIN ISO 10110, consisting of the sum of a conic section and a correction polynomial, in accordance with the equation $$z(r) = \frac{\rho r^2}{1 + \sqrt{1 - (1+k)(\rho r)^2}} + A_4 r^4 + A_6 r^6 + \ldots$$

where z is the sagittal height, r is the incident height, $\rho$ is the vertex curvature and k is the conic constant of the conic section, and A4, A6, ... are the coefficients of the correction polynomial.

14. The computer-implemented method of claim 13, wherein the at least one form feature is an actual surface power ($D_{fl}$) and the associated form dimension is the associated actual surface power value in relation to a standard refractive index ($n_s$) of 1.53 such that the first series and the second series each have types of spectacle lens semifinished products, the front surfaces of which have an actual surface power ($D_n$) with identical actual surface power values in relation to a standard refractive index ($n_s$) of 1.53, and the equalization of the actual surface power values of the front surfaces of the spectacle lens semifinished products of the different types of the first series in relation to the standard refractive index ($n_s$) of 1.53 and the actual surface power values of the front surfaces of the spectacle lens semifinished products of the different types of the second series in relation to the standard refractive index of 1.53 is carried out in such a way that the difference between one of the identical actual surface power value in relation to the standard refractive index ($n_s$) of 1.53 and the next larger identical actual surface power value in relation to the standard refractive index ($n_s$) of 1.53 is less than a predetermined threshold and/or identical to a fixedly predetermined difference value within a variance range of 20%, preferably 15%, more preferably 10%, most preferably 5%.

15. A computer program with program code for carrying out all of the method steps as claimed in claim 13, when the computer program is loaded onto a computer and/or executed on a computer.

16. A computer-readable storage medium comprising a computer program with program code for carrying out all of the method steps as claimed in claim 13, when the computer program is loaded onto a computer and/or executed on a computer.

* * * * *

UNITED STATES PATENT AND TRADEMARK OFFICE
CERTIFICATE OF CORRECTION

PATENT NO.        : 9,733,492 B2
APPLICATION NO.   : 15/339755
DATED             : August 15, 2017
INVENTOR(S)       : G. Michels et al.

It is certified that error appears in the above-identified patent and that said Letters Patent is hereby corrected as shown below:

In Column 3:
Line 41: delete "and" and substitute -- und -- therefor.

In Column 16:
Line 21: insert -- . . . -- before -- R20, --.

In Column 42:
Line 12: delete "$D_{fl}$" and substitute -- $D_n$ -- therefor.
Line 33: delete "A computer program with program code" and substitute -- A non-transitory computer-readable medium containing instructions -- therefor.
Line 35: delete "computer program is" and substitute -- instructions are -- therefor.
Line 37: insert -- non-transitory -- before -- computer-readable --.
Lines 37/38: delete "a computer program with program code" and substitute -- instructions -- therefor.
Lines 39/40: delete "computer program is" and substitute -- instructions are -- therefor.

Signed and Sealed this
Seventeenth Day of April, 2018

Andrei Iancu
*Director of the United States Patent and Trademark Office*